(12) United States Patent
Ebrahimi Tazeh Mahalleh et al.

(10) Patent No.: US 8,665,993 B2
(45) Date of Patent: Mar. 4, 2014

(54) ORTHOGONAL RESOURCE SELECTION TRANSMIT DIVERSITY

(75) Inventors: Masoud Ebrahimi Tazeh Mahalleh, Ottawa (CA); Robert Mark Harrison, Grapevine, TX (US); Youn Hyoung Heo, Suwon (KR); Yongkang Jia, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 148 days.

(21) Appl. No.: 13/248,602

(22) Filed: Sep. 29, 2011

(65) Prior Publication Data
US 2012/0082263 A1 Apr. 5, 2012

Related U.S. Application Data

(60) Provisional application No. 61/388,982, filed on Oct. 1, 2010, provisional application No. 61/443,525, filed on Feb. 16, 2011, provisional application No. 61/511,299, filed on Jul. 25, 2011.

(51) Int. Cl.
*H04L 27/00* (2006.01)

(52) U.S. Cl.
USPC ........... 375/299; 375/267; 375/260; 375/347; 455/101; 455/500; 455/132; 455/134

(58) Field of Classification Search
USPC .......... 455/101, 500, 132, 134; 375/267, 299, 375/260, 347
See application file for complete search history.

(56) References Cited

U.S. PATENT DOCUMENTS

| | | | |
|---|---|---|---|
| 2010/0085955 A1 | 4/2010 | Xilian et al. | |
| 2010/0202559 A1* | 8/2010 | Luo et al. | 375/295 |
| 2011/0026631 A1* | 2/2011 | Zhang et al. | 375/267 |
| 2011/0064115 A1* | 3/2011 | Xu et al. | 375/130 |

OTHER PUBLICATIONS

International Search Report and Written Opinion for PCT Patent Application No. PCT/US2011/053857, dated Apr. 25, 2012.
LG Electronics Inc., Transmit Diversity for CA PUCCHs, R1-104774, 3GPP TSG RAN WG1 #62, Madrid, Spain, Aug. 23-27, 2010, Section 2.
Nokia Siemens Networks, Channel Selection Details, R1-104427, 3GPP TSG RAN WG1 #62, Madrid, Spain, Aug. 23-27, 2010, Section 3.4; Table 2.
F. Khan, LTE for 4G Mobile Broadband; Air Interface Technologies and Performance, Cambridge University Press, 2009.
Nortel, RI-091925, Evaluation of transmit diversity for PUCCH in LTE-A, May 4-8, 2009, San Francisco, CA USA.

(Continued)

*Primary Examiner* — Daniel Washburn
*Assistant Examiner* — Rahel Guarino
(74) *Attorney, Agent, or Firm* — Fish & Richardson P.C.

(57) ABSTRACT

Methods are disclosed for transmitting a plurality of information bits using resource selection on multiple antennas. In one or more embodiments, the methods include: selecting a first and a second orthogonal resource from an allocation of more than two orthogonal resources according to the state of the plurality of information bits; transmitting a first symbol in a first symbol instant on a first antenna using the first orthogonal resource; and transmitting a second symbol in the first symbol instant on a second antenna using the second orthogonal resource. In some embodiments, the first and second orthogonal resources are different and the first symbol is either a reference symbol or a modulation symbol.

11 Claims, 6 Drawing Sheets

(56) References Cited

OTHER PUBLICATIONS

QUALCOMM Europe, PUCCH Transmit Diversity, R1-092065, May 4-8, 2009, San Francisco, CA USA.
S.M. Alamouti, A Simple Transmit Diversity Technique for Wireless Communications, IEEE Journal on Selected Areas in Communications, vol. 16, No. 8, Oct. 1998, pp. 1451-1458.
3GPP TSG-RAN WG1 #61, QUALCOMM, Link Comparison of Multi-UL-ACK Transmission Schemes in Support of CA, R1-102743, May 10-14, 2010, Montreal, Canada.
Ericsson, Evaluation of PUCCH Proposals for Carrier Aggregation, R1-103507, Jun. 28-Jul. 10, 2010, Dresden, Germany.
CATT, Performance evaluation of UL ACK/NACK multiplexing methods in LTE-A, RI-103468, Jun. 28-Jul. 10, 2010, Dresden, Germany.
3GPP TS 36.211 V8.8.0, 3rd Generation Partnership Project; Technical Specification Group Radio Access Network; Evolved Universal Terrestrial Radio Access (E-UTRA); Physical Channels and Modulation (Release 8), Sep. 2009.
3GPP TS 36.211, v8.8.0, 3rd Generation Partnership Project; Technical Specification Group Radio Access Network; Evolved Universal Terrestrial Radio Access (E-UTRA); Physical Channels and Modulation (Release 8), Sep. 2009.
LG Electronics, PUCCH TxD Schemes for LTE-A, 3GPP TSG RAN WG1, Meeting 56 bis, R1-091211, Seoul, Korea, Mar. 23-27, 2009.
3GPP TS 36.211, 3rd Generation Partnership Project; TEchnical Specification Group Radio Access Network; Evolved Universal Terrestrial Radio Access (E-UTRA); Physical Channels and Modulation (Release 10), v10.0.0, Dec. 2010.
3GPP TS 36.300, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description, Stage 2 (Release 8), Annex H, V8.12.0, Mar. 2009.
3GPP TS 36.101, 3rd Generation Partnership Project; Technical Specification Group Radio Access Network; Evolved Universal Terrestrial Radio Access (E-UTRA); User Equipment Radio Transmission and Reception (Release 10), section B.2, V10.1.1, Jan. 2011.

* cited by examiner

ORTHOGONAL RESOURCE SELECTION TRANSMIT DIVERSITY

CROSS-REFERENCE TO RELATED APPLICATIONS

This application claims the benefit under 35 U.S.C. §119 (e) of U.S. Provisional Patent Application No. 61/388,982 filed Oct. 1, 2010, entitled "Orthogonal Resource Selection Transmit Diversity;" U.S. Provisional Patent Application No. 61/443,525, filed Feb. 16, 2011, entitled "Transmit Diversity for LTE PUCCH with Channel Selection;" U.S. Provisional Patent Application No. 61/511,299, filed Jul. 25, 2011, entitled "Transmit Diversity for LTE PUCCH with Channel Selection." The disclosures of the above provisional applications are incorporated herein by reference in their entireties.

BACKGROUND

1. Field

The present disclosure relates in general to the field of telecommunications and, more specifically to systems and methods for transmit diversity in wireless communication systems.

2. Description of the Related Art

Multi-antenna user equipment (UE) transmission is a key component of the current Long Term Evolution-Advanced (LTE-A) work in the Third Generation Partnership Project (3GPP). Because the current LTE frame structure time division duplex (TDD) may have many more downlink subframes than uplink subframes and because each of the downlink subframes carries a transport block, current LTE TDD supports transmission of up to four Ack/Nack bits in a subframe. These four Ack/Nack bits are transmitted using channel selection. More recently, it has been agreed that 3GPP use channel selection for up to four Ack/Nack bits to support carrier aggregation for both frequency division duplex (FDD) and TDD frame structures. Therefore, the use of channel selection for Ack/Nack feedback is of growing interest.

Ack/Nack bits are carried in LTE using physical uplink control channel (PUCCH) format 1a and 1b on orthogonal resources. Because no more than two bits can be carried in these PUCCH formats, two extra information bits for TDD are needed. These extra two bits are conveyed through channel selection. A UE encodes information using channel selection by selecting an orthogonal resource to transmit on. Channel selection uses four orthogonal resources to convey these two bits This can be described using Table 1 below:

Each column of the table indicates a combination of Ack/Nack bits (or a "codeword") to be transmitted. Each row of the table represents an orthogonal resource. Each cell contains a QPSK symbol transmitted on the orthogonal resource to indicate the codeword. The "DRes" column indicates which orthogonal resource carries the QPSK symbol, and the "RRes" column indicates the orthogonal resource used to carry the reference symbol. Note that each column of the table contains only one non-zero entry, since channel selection requires that only one resource is transmitted upon at a time on one transmission path.

For example, when Ack/Nack bits '0110' are to be transmitted, the UE will transmit the QPSK data symbol '−j' using orthogonal resource '1'. The reference signal transmission will also be on orthogonal resource '1'. LTE carries Ack/Nack signaling on format 1a and 1b of the physical uplink control channel (PUCCH) (as specified in section 5.4 of 3GPP TS 36.211 V8.8.0, "3rd Generation Partnership Project; Technical Specification Group Radio Access Network; Evolved Universal Terrestrial Radio Access (E-UTRA); Physical Channels and Modulation (Release 8)", September, 2009).

The subframe structure of PUCCH formats 1a and 1b with normal cyclic prefix is shown in FIG. 1. Each format 1a/1b PUCCH is in a subframe made up of two slots. The same modulation symbol d is used in both slots. Without channel selection, formats 1a and 1b set carries one and two Ack/Nack bits, respectively. These bits are encoded into the modulation symbol d, using BPSK or QPSK modulation, depending on if one or two Ack/Nack bits are used.

Each data modulation symbol, d, is spread with the sequence, $r_{u,v}^{\alpha}(n)$ such that it is by a 12 samples long (which is the number of subcarriers in an LTE resource block in most cases). Next, the spread samples are mapped to the 12 subcarriers the PUCCH is to occupy and then converted to the time domain with an IDFT. The spread signal is then multiplied with an orthogonal cover sequence $w_p(m)$, where $m \in \{0, 1, 2, 3\}$ corresponds to each one of 4 data bearing OFDM symbols in the slot. There are 3 reference symbols (R1, R2, and R3) in each slot that allow channel estimation for coherent demodulation of formats 1a/1b.

There are 12 orthogonal spreading sequences (corresponding to $r_{u,v}^{\alpha}(i)$ with $\alpha \in \{0, 1, \ldots, 11\}$ indicating the cyclic shift) and one of them is used to spread each data symbol. Furthermore, in Release 8 of LTE (Rel-8) there are 3 orthogonal cover sequences $w_p(m)$ with $p \in \{0, 1, 2\}$ and $m \in \{0, 1, 2, 3\}$. Each spreading sequence is used with one of the orthogonal cover sequences to comprise an orthogonal resource. Therefore, up to 12*3=36 orthogonal resources are available. Each orthogonal resource can carry one Ack/Nack modulation symbol d, and so up to 36 UEs may transmit an Ack/Nack symbol on the same OFDM resource elements without mutually interfering. Similarly when distinct orthogonal resources are transmitted from multiple antennas by a UE, they will not interfere with each other, or with different orthogonal resources transmitted from other UEs. When there is no channel selection, the orthogonal resource used by the UE is known by the base station that serves it (called an enhanced

TABLE 1

PUCCH format 1b channel selection

Codewords 0 to 15
Ack/Nack Information bits: $b_3 b_2 b_1 b_0$

| RRes | DRes | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|---|
| 0 | 0 | 1 | j | −j | −1 | 0 | 0 | 0 | 0 | 0 | 0 | 0 | 0 | 0 | 0 | 0 | 0 |
| 1 | 1 | 0 | 0 | 0 | 0 | 1 | j | −j | −1 | 0 | 0 | 0 | 0 | 0 | 0 | 0 | 0 |
| 2 | 2 | 0 | 0 | 0 | 0 | 0 | 0 | 0 | 0 | 1 | j | −j | −1 | 0 | 0 | 0 | 0 |
| 3 | 3 | 0 | 0 | 0 | 0 | 0 | 0 | 0 | 0 | 0 | 0 | 0 | 0 | 1 | j | −j | −1 |

Node B, or "eNB"). As discussed above, in case of channel selection, a part of the information bits determines the orthogonal resource to be utilized. The eNB detects that part of the information bits by recognizing what orthogonal resource is carrying other information bits.

Orthogonal resources used for reference symbols are generated in a similar manner as data symbols. They are also generated using a cyclic shift and an orthogonal cover sequence applied to multiple reference signal uplink modulation symbols. Because there are a different number of reference and data modulation symbols in a slot, the orthogonal cover sequences are different length for data and for reference signals. Nevertheless, there are an equal number of orthogonal resources available for data and for reference signals. Therefore, one can use a single index to refer to the two orthogonal resources used by a UE for both the data and reference signals, and this is done in Rel-8. This index is signaled in Rel-8 as a PUCCH resource index, and is indicated in the LTE specifications, including section 5.4 of 3GPP TS 36.211 V8.8.0, "3rd Generation Partnership Project; Technical Specification Group Radio Access Network; Evolved Universal Terrestrial Radio Access (E-UTRA); Physical Channels and Modulation (Release 8)", September, 2009, as the variable $n_{PUCCH}^{(1)}$.

One cyclic shift may be used to transmit all symbols in a slot (including both data and reference symbols) associated with an antenna. In this case, the value of is constant over the slot. However, LTE Rel-8 also supports cyclic shift hopping, where $\alpha$ varies over the slot. Cyclic shift hopping transmissions are synchronized within a cell such that UEs following the cell-specific hopping pattern and do not mutually interfere. If neighbor cells also use cyclic shift hopping, then for each symbol in a slot, different UEs in the neighbor will tend to interfere with a UE in a serving cell. This provides an "interference averaging" behavior that can mitigate the case where one or a small number of neighbor cell UEs strongly interfere with a UE in the serving cell. Because the same number of non-mutually interfering orthogonal resources are available in a cell regardless of if cyclic shift hopping is used or not, it is possible to treat orthogonal resource equivalently for the hopping and non-hopping cases. Therefore, hereinafter when we refer to an orthogonal resource, it may be either hopped or not.

The LTE PUCCH format 1a/1b structure shown in FIG. 1 varies somewhat depending on a few special cases. One variant of the structure that is important to Tx diversity designs for format 1a/1b is that the last symbol of slot 1 may be dropped (not transmitted), in order to not interfere with sounding reference signal (SRS) transmissions from other UEs.

In the context of LTE-Advanced carrier aggregation, a UE may receive scheduling grants on the physical downlink control channels (PDCCHs) of multiple component carriers, identified as 'primary' or 'secondary' component carriers (these are also referred to as 'primary cells' and 'secondary cells', respectively). Hereinafter, we will use the abbreviation 'PCC' and 'SCC' to refer to the primary or secondary component carriers (or 'cells'), respectively.

When a UE receives at least one scheduling grant for one transport block, but also does not receive a different grant for a second, simultaneously transmitted, transport block, it can indicate a Nack state for the second transport block. This use of one value for both Nack and when a grant is known to be missed is often referred to as signaling 'Nack/DTX' in 3GPP parlance, due to the similarity to the case where a UE would not transmit when it missed a grant for one transport block in Rel-8. Transmitting a Nack/DTX when a grant is missed allows a fixed number of information bits to be transmitted for Ack/Nack by the UE even when the number of transport blocks for which it receives scheduling grants varies. That is, when it receives two grants, it transmits two Ack/Nack bits, and when it misses a grant, it still transmits two Ack/Nack bits, but sets the one it missed the grant for to 'Nack/DTX'.

Multi-antenna UE transmission is a key work item of the current LTE-Advanced (LTE-A) work in the Third Generation Partnership Project (3GPP). Uplink transmit diversity techniques are under consideration for standardization, and have been proposed for physical uplink shared channel (PUSCH), and all PUCCH formats.

Many of the uplink Tx diversity schemes would have one or more of the following drawbacks if they were to be applied to LTE Ack/Nack channel selection: 1) Use extra uplink resource, for example by transmitting the same symbol on different orthogonal resources; 2) increase the peak-to-average transmit power ratio (or "cubic metric"), leading to higher peak power requirements for the UE power amplifiers; 3) reduce robustness to multipath by requiring nearly the same channel response on different subcarriers; or 4) require an even number of OFDM symbols in a PUCCH slot.

There are two main classes of transmit diversity approaches that could be considered for use on 3GPP PUCCH format 1a/1b. The first class of methods described in (1) R1-091925, "Evaluation of transmit diversity for PUCCH in LTE-A", Nortel, May 4-8, 2009, San Francisco, USA; and (2) R1-092065, "PUCCH Transmit Diversity", Qualcomm Europe, May 4-8, 2009, San Francisco, USA is space-or-thogonal transmit diversity, or "SORTD." As can be seen in the two-antenna example in FIG. 2a, in this approach each antenna transmits a different orthogonal resource that carries the channel coded control information of PUCCH.

There are two variants of SORTD. In the first variant, the coded bits are duplicated before spreading with the orthogonal resource associated with each antenna. This is labeled as "simple repetition for SORTD" in FIG. 2b. This method provides maximum diversity gain in a flat fading channel, because the coded bits can be perfectly separated using the two orthogonal spreading sequences. The disadvantage of this approach is that two orthogonal resources are used, which means that half as many users can share the same PUCCH as compared with when each UE would only use one PUCCH orthogonal resource.

In the second variant called space-orthogonal spatial multiplexing or "SORSM" labeled as "Joint Coding for SORTD" in FIG. 2c, a lower rate encoder is used and different coded bits are transmitted on the orthogonal resources and antennas. This variant has better performance than the simple repetition approach due to the increased coding gain of the R/2 rate code. However, it shares the same disadvantage as the first variant: it requires twice the number of orthogonal resources used for 1 antenna transmission. This disadvantage is one of problems targeted by this disclosure.

The second class of methods is space time block codes, such as the "Alamouti" code, known to those of skill in the art. A forward error correction code is typically used, and then the coded symbols are modulated to form a symbol stream, 's'. These symbols are taken two at a time, and then the first symbol is transmitted on the first antenna at a first time, while at the same time the second symbol is transmitted on the second antenna. At a second time instant, the second symbol is negated and conjugated and transmitted on the first antenna, while at the same time the first symbol is conjugated and transmitted on the second antenna. Because the symbols are transmitted simultaneously on the two antennas, but also are transmitted over two time slots, the number of symbols transmitted on each antenna is the same as the number of symbols produced by the modulation and coding (that is, this is a "rate one STBC"). Due to the properties of the STBC, a receiver can recover the two transmitted symbols such that the power from the two antennas combines efficiently, and excellent diversity gain is achieved. This diversity gain reduces the chance of an erroneous reception, improving performance under difficult channel conditions.

Since STBCs often operate on pairs of symbols, their direct application to channel selection is difficult, because each PUCCH carries only one modulation symbol. A second problem is that the channel should not change between the two time instants. Because PUCCH formats 1a/1b are frequency hopped between slots, the channel varies significantly between the two slots. Since channel selection is used to allow transmission of more than 2 Ack/Nack bits, an alternative solution to support more than 2 bits is to modify format 1a/1b to carry multiple symbols in a slot by using a reduced spreading factor. However, we would prefer not to make such a significant change to the slot structure, especially since such a structure would likely have worse performance and there can be other problems, such as operation in cases where the last OFDM symbol in the second slot of PUCCH format 1a/1b may be dropped).

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

Brief Description of the Drawings

Figure 1:
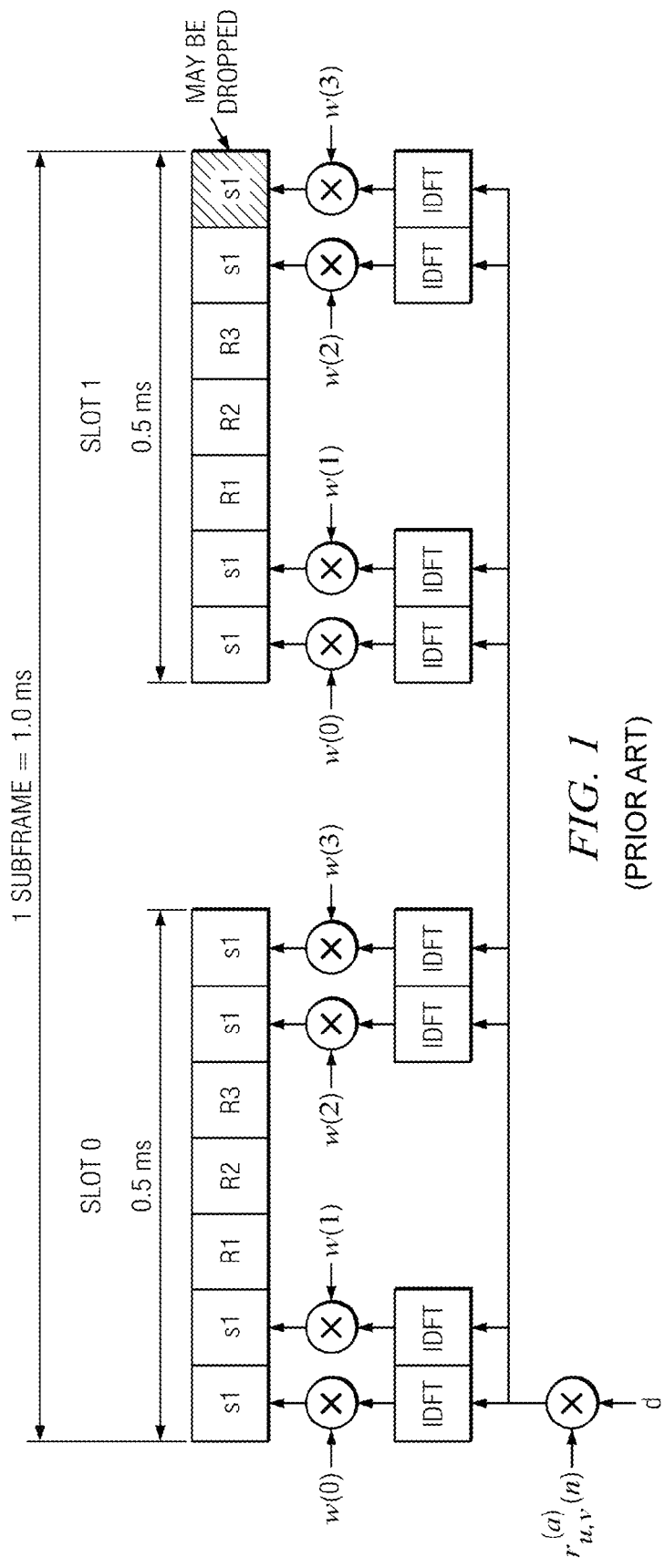
Figure 2A:
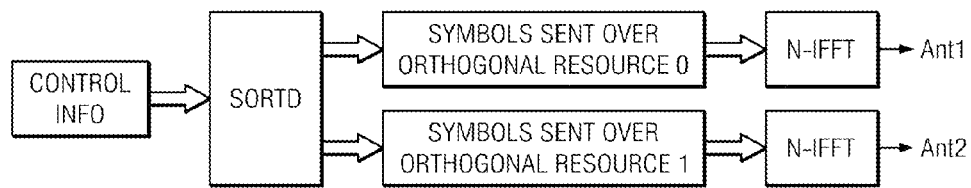
Figure 2B:
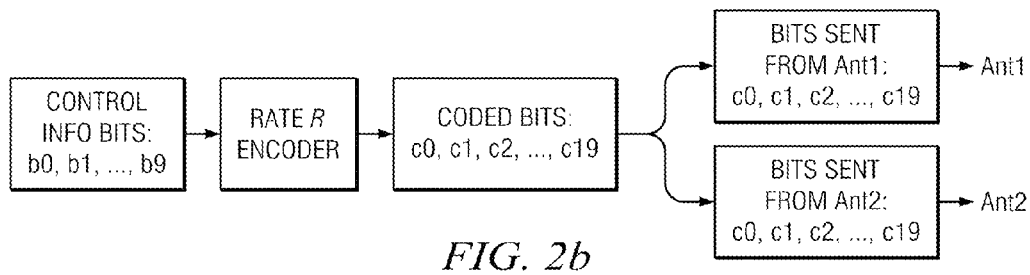
Figure 2C:
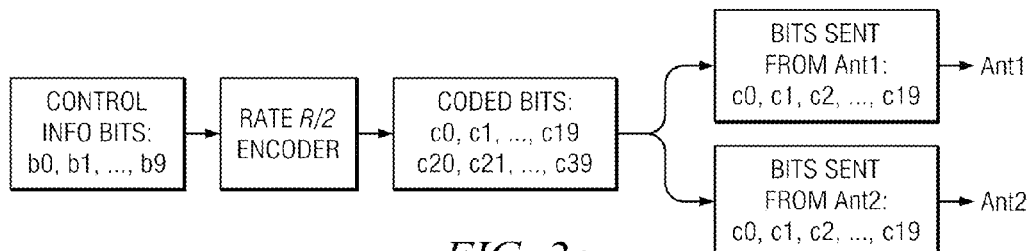
Figure 3:
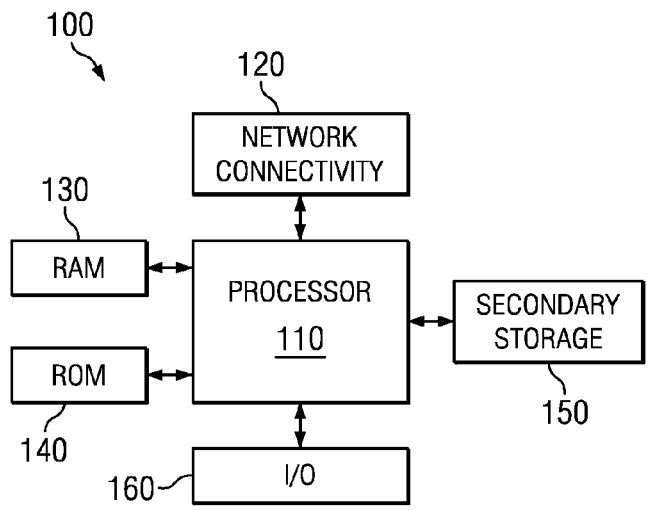
Figure 4:
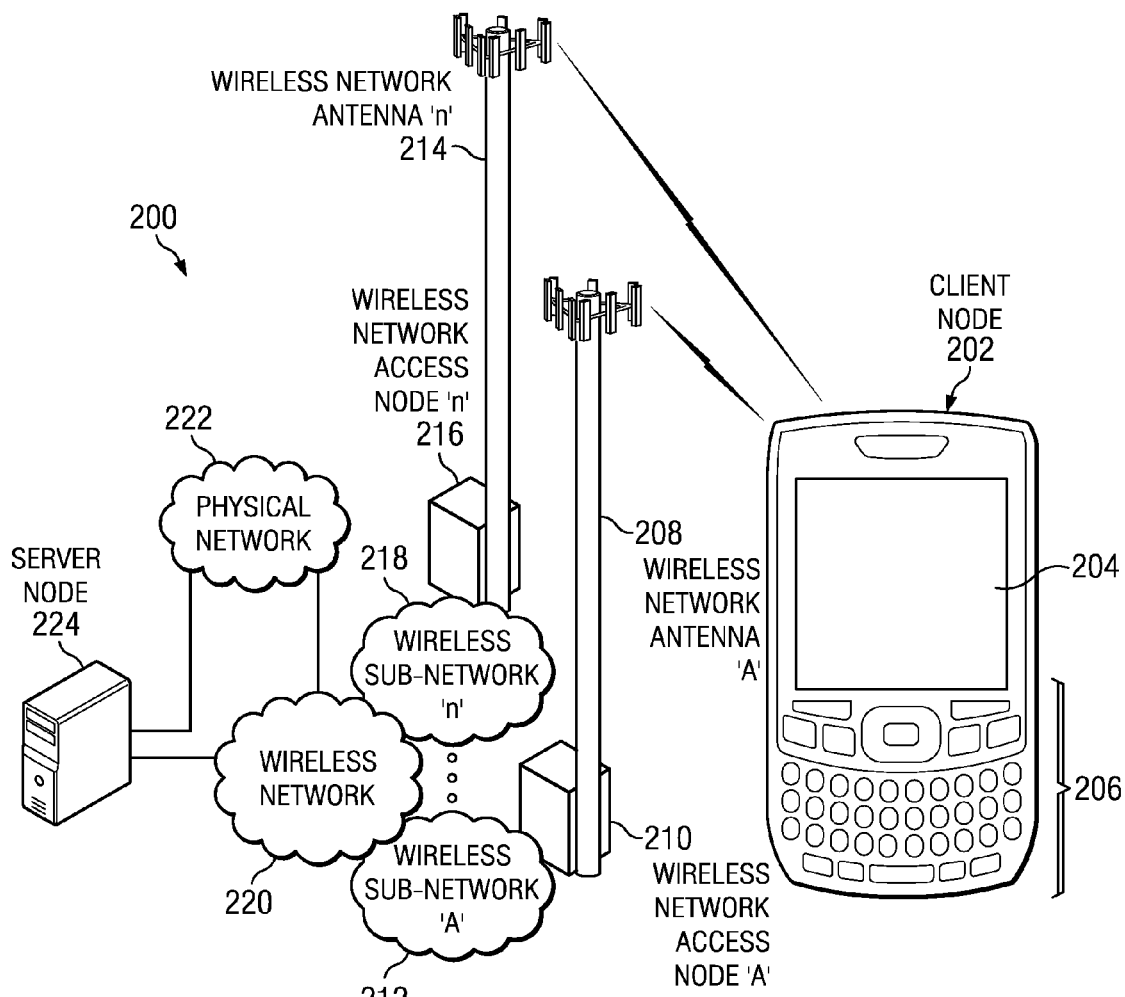
Figure 5:
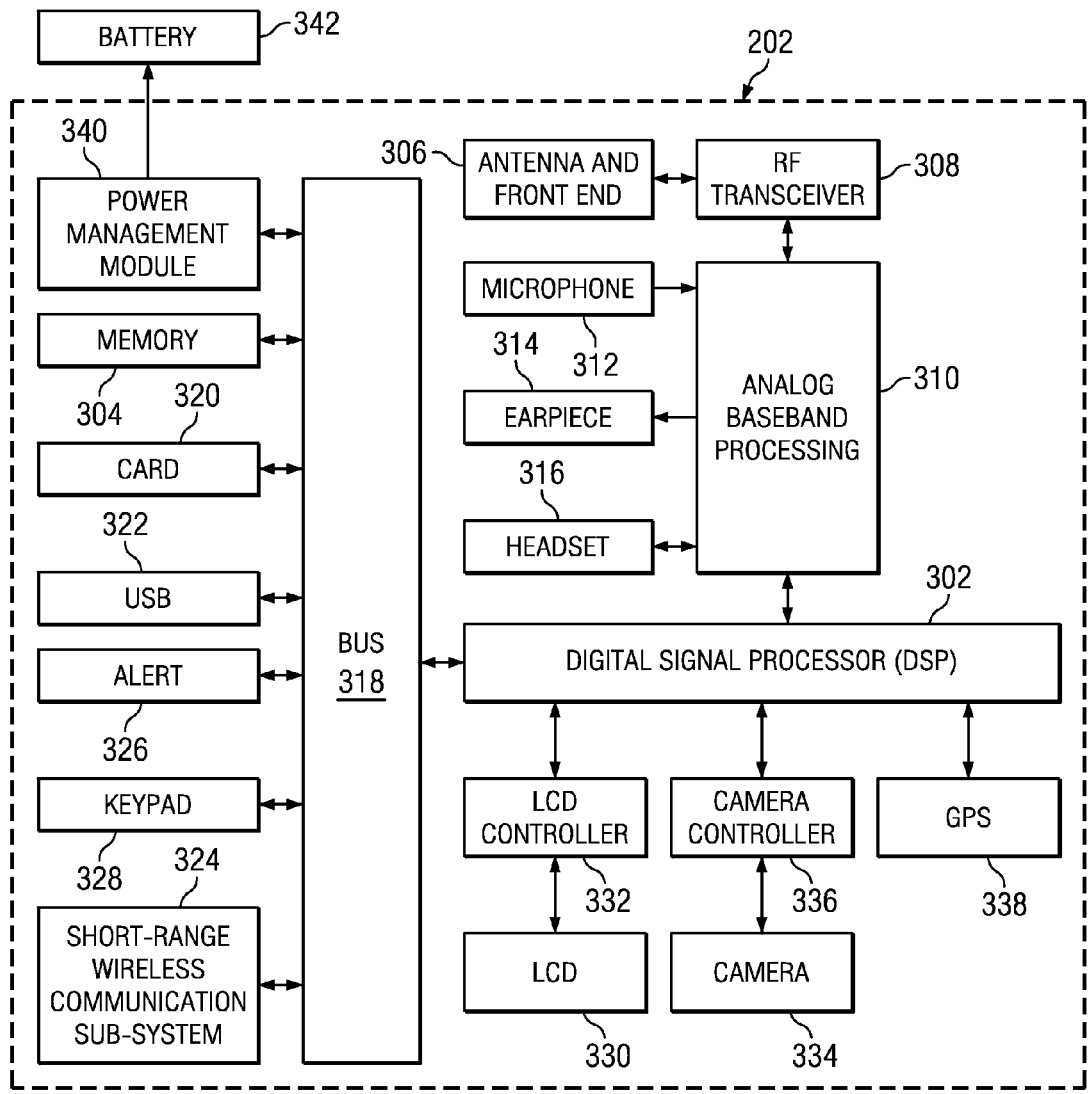
Figure 6:
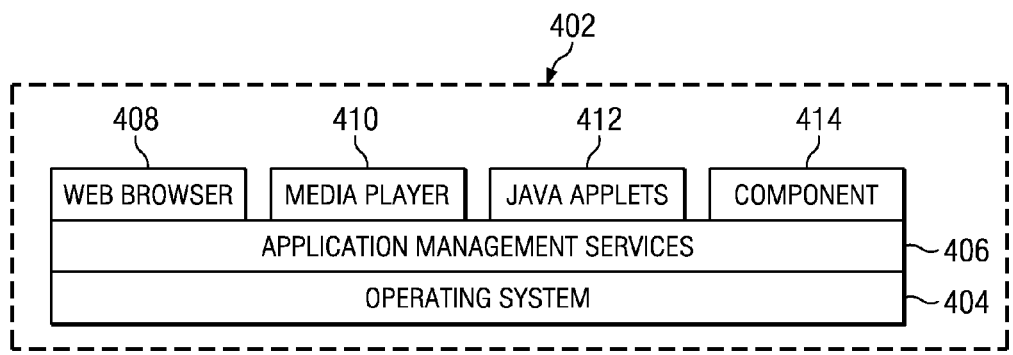
Figure 7:
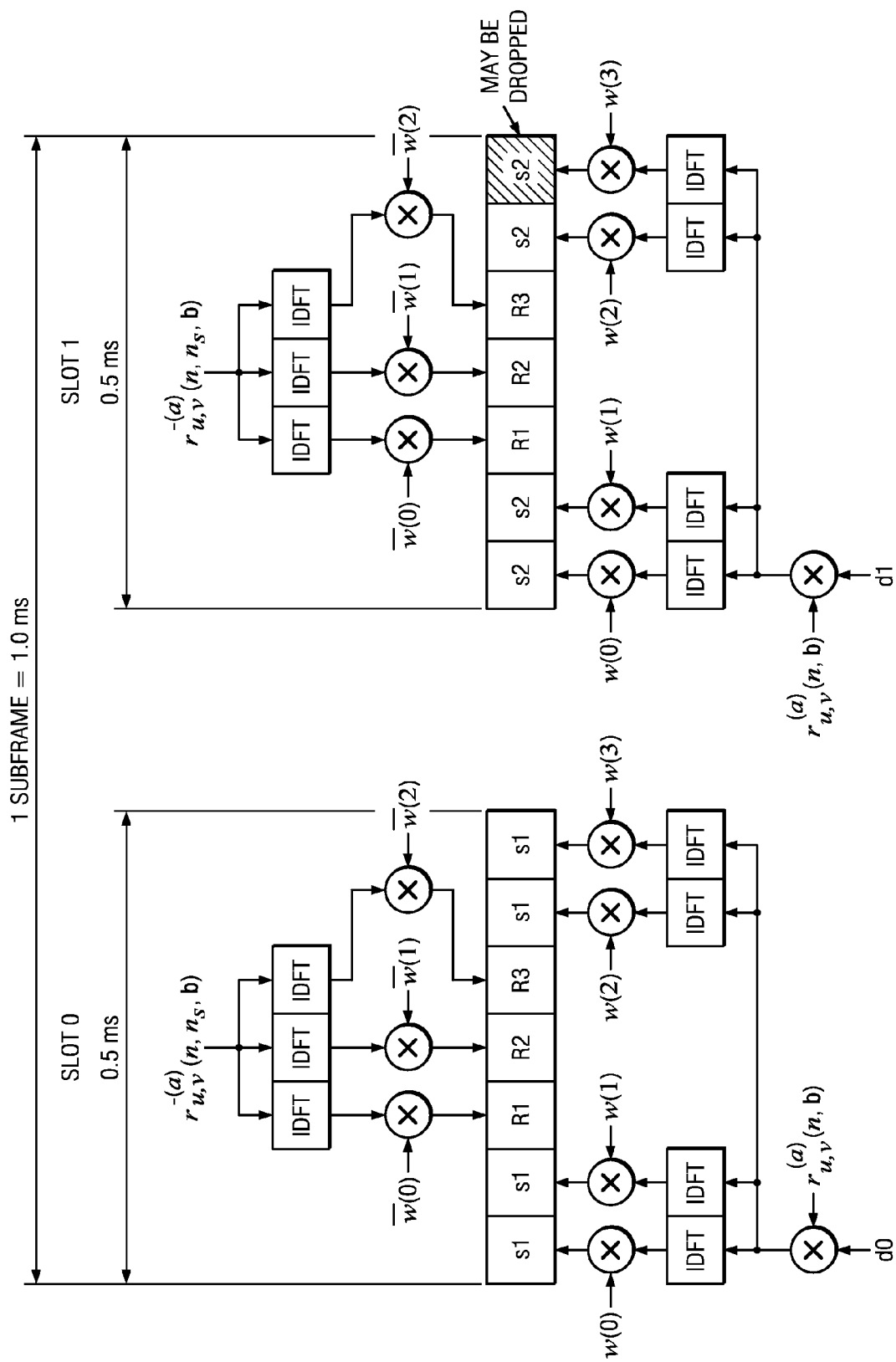
Figure 8:
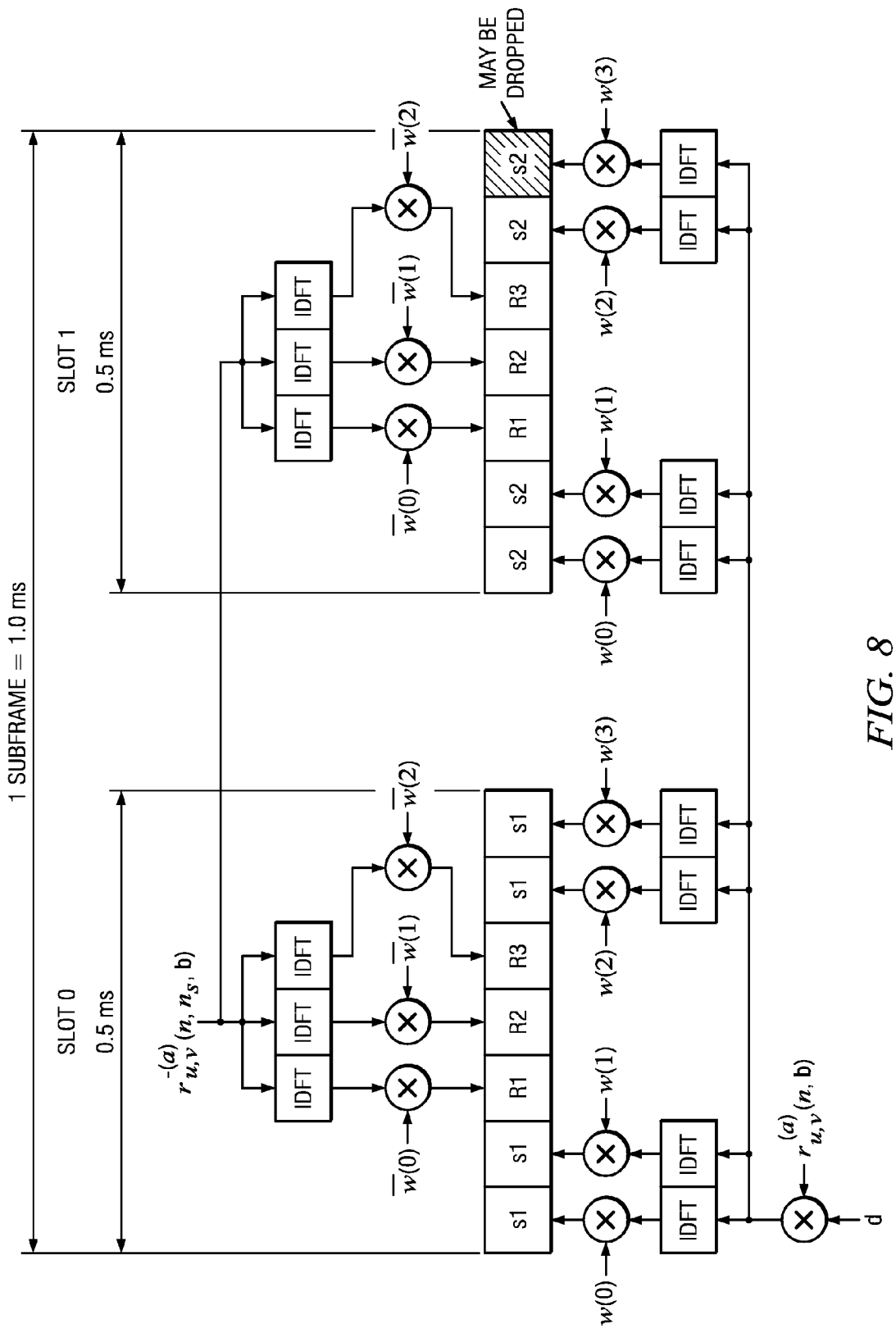

FIG. 1 is an illustration of a conventional subframe having the structure of PUCCH formats 1a and 1b with normal cyclic prefix;

FIG. 2a is an illustration of a communication system implementing space-orthogonal transmit diversity (SORTD);

FIG. 2b is an illustration of an implementation of SORTD comprising bit repetition;

FIG. 2c is an illustration of an implementation of SORTD comprising space-orthogonal spatial multiplexing (SORSM);

FIG. 3 is an illustration of a communication system for implementing one or more of embodiments disclosed herein;

FIG. 4 shows a wireless-enabled communications environment including an embodiment of a client node as implemented in accordance with various embodiments of the disclosure;

FIG. 5 is a block diagram of an exemplary client node as implemented with a digital signal processor (DSP) in accordance with embodiments of the disclosure;

FIG. 6 shows a software environment that may be implemented by a digital signal processor (DSP) in accordance with embodiments of the disclosure;

FIG. 7 shows a subframe comprising a modified PUCCH format 1a/1b with slot-specific transmission; and FIG. 8 shows a subframe comprising a modified PUCCH format 1a/1b with an alternative slot structure.

DETAILED DESCRIPTION

Various illustrative embodiments of the present disclosure will now be described in detail with reference to the accompanying figures. While various details are set forth in the following description, it will be appreciated that the present embodiments may be practiced without these specific details, and that numerous implementation-specific decisions may be made to the embodiments described herein to achieve the inventor's specific goals, such as compliance with process technology or design-related constraints, which may vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present embodiments. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 3 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 3.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 3 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

FIG. 4 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 4, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

FIG. 5 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 5, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 306 includes multiple antennas to provide spatial diversity which can be used to overcome difficult channel conditions or to increase channel throughput. As is known to those skilled in the art, multiple antennas may also be used to support beam forming and/or multiple input multiple output (MIMO) operations thereby further improving channel throughput or robustness to difficult channel conditions. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

FIG. 6 illustrates a software environment 402 that may be implemented by a digital signal processor (DSP). In this embodiment, the DSP 302 shown in FIG. 5 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 6 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 4 may likewise include a processing component that is capable of executing instructions related to the actions described above.

Embodiments of the disclosure described herein below present a flexible transmit diversity technique suitable for use on the LTE-A uplink control channel ("PUCCH"). The flexible transmit diversity technique can reduce or avoid drawbacks of existing techniques proposed for the PUCCH. The technique can use a slot format that is backward compatible with existing LTE PUCCH slot formats. In addition, the technique can provide performance comparable to techniques that use twice as many orthogonal resources (and therefore allow half as many users to share the same PUCCH as the technique).

Embodiments of the disclosure provide a two antenna transmit diversity coding scheme for channel selection based signaling, exploiting the fact that multiple orthogonal resources are available to the UE, and using these resources for diversity purposes as well as to communicate information. These embodiments are herein after referred to as space time resource selection diversity (STRSD).

In one embodiment, the STRSD uses the same slot structure as LTE Rel-8 single antenna channel selection (the PUCCH format 1b slot structure). A second modulation symbol is added to format 1a/1b in LTE embodiments using channel selection on format 1a/1b. In this embodiment, the STRSD uses the same QPSK modulation scheme as LTE Rel-8 single antenna channel selection. In various embodiments, the STRSD uses the same number of orthogonal resources as LTE Rel-8 single antenna channel selection and also as agreed for single antenna channel selection in LTE Release 10 (Rel-10).

When two antennas transmit simultaneously in a slot in this embodiment, transmissions are on two different orthogonal resources (one for each antenna) in that slot. The same orthogonal resource may be used for transmissions from an antenna in two slots. To achieve better performance, two slots may use two distinct orthogonal resources for transmission on the same antenna. The combination of modulation symbols on the antennas may be different between the two slots. In various embodiments, at least one modulation symbol on one of the antennas is different between the two slots for that antenna. In some embodiments, the orthogonal resource assigned to reference signals may be different from the one assigned to data in the same slot and on the same antenna and may vary with the codeword. The orthogonal resource used for reference signals may be the same as the one used for data (as in LTE Rel-8 single antenna channel selection). In some embodiments, the orthogonal resource used for reference signals can be fixed (for an antenna and a slot) and does not vary with codeword.

In some embodiments, the STRSD may support variable rate operation. In these embodiments, the number of orthogonal resources decreases proportionally to the number of information bits in the transmission and the physical layer signaling supports dynamically varying the number of orthogonal resources in proportion to the number of information bits.

In some embodiments, the STRSD may be designed to have commonality with the mapping table of single Tx channel selection. In these embodiments, the mapping from information bits to the modulation symbols and the orthogonal resources used for reference signal (RS) and data on one of the antennas may be the same as single Tx channel selection.

The STRSD may be designed to work properly even if UE does not detect part of the scheduled PDCCHs and is not able to determine the orthogonal resources indicated by the missed PDCCH.

In one embodiment, exactly two antennas transmit in each slot. This makes efficient use of the UEs power amplifiers, since both power amplifiers are always used. In some embodiments, the code uses at most an equal number of orthogonal resources as the number of Ack/Nack bits. This enables the code to operate without increasing the number of orthogonal resources (unlike SORTD).

In some embodiments, orthogonal resources on an antenna and a slot experience approximately the same fading. This is generally true for LTE orthogonal resources, except in high multipath or high speed conditions. In these embodiments, channels may or may not fade independently between two slots. The two coded symbols of a PUCCH Ack/Nack transmission may be uncorrelated due to slot hopping. However, the fading can be highly correlated in very low delay spread channels.

Embodiments of STRSD described herein contemplate multiple antenna transmission. As is known to those of skill in the art, an antenna port can be defined as a point where one or more physical antennas can be connected to a transmit and/or receive chain, whereas an antenna can refer to one physical antenna. Embodiments described herein can function with multiple virtualized physical antennas or a single physical antenna connected to an antenna port An embodiment of the STRSD code is shown in Table 2. Unlike the Rel-8 channel selection method used for single antenna transmission that is described herein above, each codeword is transmitted using 4 QPSK symbols, corresponding to 2 antenna ports (indicated by the 'Ant' rows) and 2 slots (indicated by the 'Slot' rows). While these 4 QPSK symbols are distinct in the code of Table 2, they are the same in other STRSD embodiments contemplated herein. As in Rel-8, only one orthogonal resource is transmitted on each antenna in each slot. For example, if codeword '1010' is to be transmitted, in the first slot (slot 0) the QPSK data symbol '−j' is transmitted on the first antenna (antenna 0) using resource 3 and a '1' data symbol is transmitted simultaneously on the second antenna using resource 0. In the second slot, a '−j' is transmitted on resource 3 on the first antenna, and a 'j' is transmitted on the second antenna using resource 0. The resource used for the reference signal for codeword '1010' is 1 in the first slot on the first antenna, and 2 on the second antenna in the first slot. In the second slot, the resource used for the reference signal for codeword '1010' is the same as the first slot: resource 1 for the first antenna and resource 2 for the second antenna.

TABLE 2

STRSD code

Codewords 0 to 15
Information bits: $b_3b_2b_1b_0$

| Ant. | Slot | RRes | DRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|---|
| 0 | 0 | 0 | 0 | 1 | j | −j | −1 | 0 | 0 | 0 | 0 | 0 | 0 | 0 | 0 | 0 | 0 | 0 | 0 |
|   | 1 | 1 | 1 | 0 | 0 | 0 | 0 | 1 | j | −j | −1 | 0 | 0 | 0 | 0 | 0 | 0 | 0 | 0 |
|   |   | 0 | 2 | 0 | 0 | 0 | 0 | 0 | 0 | 0 | 0 | 1 | j | −j | −1 | 0 | 0 | 0 | 0 |

TABLE 2-continued

STRSD code

Codewords 0 to 15
Information bits: $b_3b_2b_1b_0$

| Ant. | Slot | RRes | DRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|---|
| | | 1 | 3 | 0 | 0 | 0 | 0 | 0 | 0 | 0 | 0 | 0 | 0 | 0 | 0 | 1 | j | -j | -1 |
| | 1 | 0 | 0 | 1 | j | -j | -1 | 0 | 0 | 0 | 0 | 0 | 0 | 0 | 0 | 0 | 0 | 0 | 0 |
| | | 1 | 1 | 0 | 0 | 0 | 0 | 1 | j | -j | -1 | 0 | 0 | 0 | 0 | 0 | 0 | 0 | 0 |
| | | 0 | 2 | 0 | 0 | 0 | 0 | 0 | 0 | 0 | 0 | 1 | j | -j | -1 | 0 | 0 | 0 | 0 |
| | | 1 | 3 | 0 | 0 | 0 | 0 | 0 | 0 | 0 | 0 | 0 | 0 | 0 | 0 | 1 | j | -j | -1 |
| 1 | 0 | 2 | 0 | 0 | 0 | 0 | 0 | 0 | 0 | 0 | 0 | 0 | 0 | 0 | 0 | -j | j | 1 | -1 |
| | | 3 | 1 | -j | j | 1 | -1 | 0 | 0 | 0 | 0 | 0 | 0 | 0 | 0 | 0 | 0 | 0 | 0 |
| | | 2 | 2 | 0 | 0 | 0 | 0 | -j | j | 1 | -1 | 0 | 0 | 0 | 0 | 0 | 0 | 0 | 0 |
| | | 3 | 3 | 0 | 0 | 0 | 0 | 0 | 0 | 0 | 0 | -j | j | 1 | -1 | 0 | 0 | 0 | 0 |
| | 1 | 2 | 0 | 0 | 0 | 0 | 0 | 0 | 0 | 0 | 0 | 0 | 0 | 0 | 0 | -j | 1 | j | -1 |
| | | 3 | 1 | -j | 1 | j | -1 | 0 | 0 | 0 | 0 | 0 | 0 | 0 | 0 | 0 | 0 | 0 | 0 |
| | | 2 | 2 | 0 | 0 | 0 | 0 | -j | 1 | j | -1 | 0 | 0 | 0 | 0 | 0 | 0 | 0 | 0 |
| | | 3 | 3 | 0 | 0 | 0 | 0 | 0 | 0 | 0 | 0 | -j | 1 | j | -1 | 0 | 0 | 0 | 0 |

Note that there is a transmission state in the STRSD code that is not shown in the table above. If the UE cannot determine the orthogonal resources it should use for transmission in a given subframe, it will not transmit Ack/Nack in that subframe. This is referred to as 'DTX' in 3GPP parlance. For all embodiments of this invention, there is a state of operation where if the UE cannot determine any of the orthogonal resources it needs to transmit upon in a subframe, it will not transmit Ack/Nack information in that subframe.

Component #1: Slot-Specific Modulation Symbols and Orthogonal Resources for PUCCH Format 1a/1b Because it improves performance, an embodiment of STRSD in Table 2 uses a slot format with two distinct modulation symbols in two symbol instants. PUCCH format 1a/1b at present uses the same modulation symbol on both slots. More importantly, because it substantially improves performance, an embodiment varies the orthogonal resource used for the reference symbols with the Ack/Nack codeword being signaled. Such a modified subframe structure could take the form shown in FIG. 7.

As can be seen from FIG. 7, this subframe structure is nearly the same as Rel-8 PUCCH format 1a/1b. One change is that different modulation symbols, d0 and d1, are used in slot 0 and slot 1, respectively. Another change is that the orthogonal resources vary across slots. The sequence $r_{u,v}^\alpha(n, b)$ is unchanged from Rel-8, varying in the same way with respect to symbols instants, and subframe numbers. Also as in Rel-8 channel selection, the sequence is selected as a function of the Ack/Nack codeword being signaled. (Here, the codeword is indicated as the information bit sequence vector b.) While in Rel-8, the same orthogonal resources are used for data and for the reference signals, unlike Rel-8, the orthogonal resource in the preferred embodiment varies with the Ack/Nack codeword in a way that data and RS have different orthogonal resources. This marks the third difference between the new subframe structure and that of Rel-8 PUCCH formats 1a/1b. To reflect this new dependence of the orthogonal resource used for the reference signals on the Ack/Nack codeword and slot number $n_s$, we now indicate the sequence used to spread each reference symbol with the variable $\bar{r}_{u,v}^\alpha(n,n_s,b)$.

Component #2: Joint Orthogonal Resource Selection and Joint Modulation Symbol Selection In order to improve performance, the code varies the transmitted symbols between slots and antennas. It also varies the orthogonal resource between slots and antennas. If an appropriate measure for the distance of codewords is available, for each codeword all 4 modulation symbols (for two slots and two transmit antennas) can be selected jointly such that the minimum codewords distance is maximized. The same joint approach is applied for selecting the orthogonal resources that are used for transmission of each codeword. In the following, we describe a heuristic measure of codeword distances based on the well-known Euclidean distance. Using this measure, it is possible to examine the benefit of these joint symbol selection and joint resource selection approaches through their impact on inter-codeword distance.

We first define a vector $x_i$ that contains the modulation symbol on each orthogonal resource for each antenna and for each slot corresponding to codeword index i. The contents of this vector are the column of the code table corresponding to codeword index i. For example, if codeword '1010' is used in the STRSD code of Table 2, $x_i$ contains 16 elements, and is:

$x_i = [0,0,0,-j,0,0,0,-j,1,0,0,0,0,j,0,0,0]^T$

As the transmitted signals from the 2 TX antennas are combined at the RX antenna(s), the following combining matrix is defined:

$$C = \begin{bmatrix} c_{00}I & 0 & c_{10}I & 0 \\ 0 & c_{01}I & 0 & c_{11}I \end{bmatrix}$$

where the symbols I and 0 in above equation denote the 4-by-4 identity matrix and 0-matrix respectively. $c_{il}$ is the channel response for antenna i in slot l. In order to illustrate STRSD's distance properties, we assume the channel is a flat faded Rayleigh channel, where the antennas and slots fade independently and the fading is identical across all subcarriers in a resource block in a lot. Therefore the $c_{il}$ are complex Gaussian variables. The combined transmitted signal from the two TX antennas can then be expressed as: $Cx_i$ Because the orthogonal resource used to carry reference signals is used to distinguish the codeword, we need to take it into account when computing the inter-codeword distance. To do this, it is possible to create an alternative representation of the reference signal part of the STRSD code of Table 2, given in the table below. Note that the same information bit ordering is used for the codewords in Table 3 (namely $b_3b_2b_1b_0$). Furthermore, unless otherwise noted, the same bit ordering is used for all the STRSD codes that follow.

TABLE 3

Alternative representation of reference signal for STRSD code

| Ant. | Slot | RRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|
| 0 | 0 | 0 | 1 | 1 | 1 | 1 | 0 | 0 | 0 | 0 | 1 | 1 | 1 | 1 | 0 | 0 | 0 | 0 |
|   |   | 1 | 0 | 0 | 0 | 0 | 1 | 1 | 1 | 1 | 0 | 0 | 0 | 0 | 1 | 1 | 1 | 1 |
|   |   | 2 | 0 | 0 | 0 | 0 | 0 | 0 | 0 | 0 | 0 | 0 | 0 | 0 | 0 | 0 | 0 | 0 |
|   |   | 3 | 0 | 0 | 0 | 0 | 0 | 0 | 0 | 0 | 0 | 0 | 0 | 0 | 0 | 0 | 0 | 0 |
|   | 1 | 0 | 1 | 1 | 1 | 1 | 0 | 0 | 0 | 0 | 1 | 1 | 1 | 1 | 0 | 0 | 0 | 0 |
|   |   | 1 | 0 | 0 | 0 | 0 | 1 | 1 | 1 | 1 | 0 | 0 | 0 | 0 | 1 | 1 | 1 | 1 |
|   |   | 2 | 0 | 0 | 0 | 0 | 0 | 0 | 0 | 0 | 0 | 0 | 0 | 0 | 0 | 0 | 0 | 0 |
|   |   | 3 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 |
|   |   | 1 | 0 | 0 | 0 | 0 | 0 | 0 | 0 | 0 | 0 | 0 | 0 | 0 | 0 | 0 | 0 | 0 |
|   |   | 2 | 0 | 0 | 0 | 0 | 1 | 1 | 1 | 1 | 0 | 0 | 0 | 0 | 1 | 1 | 1 | 1 |
|   |   | 3 | 1 | 1 | 1 | 1 | 0 | 0 | 0 | 0 | 1 | 1 | 1 | 1 | 0 | 0 | 0 | 0 |
|   | 1 | 0 | 0 | 0 | 0 | 0 | 0 | 0 | 0 | 0 | 0 | 0 | 0 | 0 | 0 | 0 | 0 | 0 |
|   |   | 1 | 0 | 0 | 0 | 0 | 0 | 0 | 0 | 0 | 0 | 0 | 0 | 0 | 0 | 0 | 0 | 0 |
|   |   | 2 | 0 | 0 | 0 | 0 | 1 | 1 | 1 | 1 | 0 | 0 | 0 | 0 | 1 | 1 | 1 | 1 |
|   |   | 3 | 1 | 1 | 1 | 1 | 0 | 0 | 0 | 0 | 1 | 1 | 1 | 1 | 0 | 0 | 0 | 0 |

The structure of the table is similar to the data part of the code with the rows resorted in such a way that the reference resource is in increasing order. Moreover, because the reference signals are constant, each cell of the table contains a '1' if the reference signal is transmitted on a resource corresponding to the codeword.

We now can define a vector $y_i$ that contains the reference signal part of the transmission on each orthogonal resource for each antenna and for each slot corresponding to codeword index i. The contents of this vector are the column of the reference signal table corresponding to codeword index i. For example, if codeword '1010' is used in the STRSD code, we look up the '1010' column of Table 3, to find $y_i$. Here, $y_i$ also contains 16 elements, and is:

$y_i = [0,0,0,1,0, 0,0,1,1,0, 0,0,1,0,0, 0]^T$

As can be seen from FIG. 8, the reference signals and data occupy different symbol instants, and there are 4 data symbols and 3 reference symbols in each slot. Because they are in different symbols and because the code is constructed such that different orthogonal resources are always used on the two antennas, it is possible to treat them independently, and concatenate $x_i$ and $y_i$ to form a composite vector, $z_i$, used to compute the distance. Furthermore, because the data and reference symbols are identical within each slot, if we assume the channel is constant over both slots, it is possible to simply scale $x_i$ and $y_i$ appropriately to form $z_i$. Therefore, we form $z_i$ as follows:

$$z_i = \begin{bmatrix} 4Cx_i \\ 3Cy_i \end{bmatrix}$$

It is possible to compute the normalized squared Euclidean distance between two codewords with indices i and l as:

$$d_{il} = \frac{(z_i - z_l)^H (z_i - z_l)}{2\sqrt{z_i^H z_i z_l^H z_l}}$$

where $x^H$ is the conjugate transpose of x.

Because it can be assumed that $c_{il}$ are random variables, it is possible to compute the distance metric over 10,000 draws (where a draw generates all the $c_{il}$), and examine the average of each $d_{il}$ (between all codewords) over the trials. Note that while this averaged metric does not directly indicate the improvement in required transmit power to reach a specified error rate, it is still indicative of the performance of a code and is useful for comparing different code designs. It can be seen that each codeword has approximately the same set of average distances to each of the other codewords, and the average distances from a codeword to all other codewords are:

d=[0.64,0.64, 0.64,0.64, 0.80,0.80, 0.96,1.00, 1.00,1.00, 1.00,1.00, 1.00,1.00, 1.00]

It can be seen that code d has 4 codewords with an average minimum distance of 0.64, and that there are two codewords with the next largest average distance of 0.80.

It is possible to investigate the benefit of varying the combination of modulation symbol on the antennas between slots by setting the modulation symbols on the second antenna to be the same as those of the first antenna in both slots. The distances are then:

d=[0.60,0.60, 0.60,0.60, 0.60,0.60, 1.00,1.00, 1.00,1.00, 1.00,1.00, 1.00,1.00, 1.21]

There are 6 codewords with the average minimum distance, but this distance is now 0.60, which is slightly lower than the 0.64 where the symbol combinations vary between slots. More importantly, when compared to the original STRSD code, it can be seen that two of the 6 smallest distances of the STRSD code are 0.8, which is 1.3 times larger than the smallest 6 distances of the modified STRSD code. This lower distance means that codewords are harder to distinguish, and the performance of the code is reduced. Those of skill in the art will appreciate, therefore, that varying the symbol combinations between slots can improve STRSD code performance.

It is also possible to study the benefit of varying the reference signals as a function of data by changing them so that they do not vary. In this case, it is possible to use $x_i$ as for the STRSD code of Table 2, but to set $y_i$ such that the same 4 elements are 1 for all $y_i$, and only those 4 elements of each $y_i$ are non-zero. In this case, the distances are:

d=[0.64,0.64, 0.64,0.64, 0.64,0.64, 0.64,0.64, 0.64,0.64, 0.64,0.64, 0.80,0.80, 0.96]

In this case, 12 codewords have a minimum distance of 0.64. Because the minimum distance is substantially lower for many codewords, the performance will be even worse than the case where the symbol combinations are held fixed between slots. Therefore, varying the reference signals as a function of data appears to be especially important to the STRSD code design.

In general, those of skill in the art will appreciate that while the two slots can be implemented as two independent transmissions at different times, they can be any two distinct time-frequency resources. In general, time-frequency resource may be defined as the smallest unit of a physical channel that can carry a complete modulation symbol when transmitted on a single antenna. For the LTE PUSCH, a resource element is a time-frequency resource. Since the LTE PUCCH is spread with an orthogonal sequence across subcarriers, for the PUCCH, a time frequency resource comprises multiple subcarriers spread with the spreading sequence. For CDMA systems, a time-frequency resource comprises multiple chip times spread with the spreading sequence.

Also, while STRSD has been described in the context of using PUCCH format 1a/1b orthogonal resource, those of skill in the art will understand that any set of distinct time-frequency resources may be used.

Alternative Embodiment #1

TABLE 4

Alternative STRSD Code #1

| Ant. | Slot | RRes | DRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|---|
| | | | | | | | | Codewords 0 to 15 | | | | | | | | | | | |
| 0 | 0 | 0 | 0 | 1 | j | -j | -1 | 0 | 0 | 0 | 0 | 0 | 0 | 0 | 0 | 0 | 0 | 0 | 0 |
| | | 0 | 1 | 0 | 0 | 0 | 0 | 1 | j | -j | -1 | 0 | 0 | 0 | 0 | 0 | 0 | 0 | 0 |
| | | 0 | 2 | 0 | 0 | 0 | 0 | 0 | 0 | 0 | 0 | 1 | j | -j | -1 | 0 | 0 | 0 | 0 |
| | | 0 | 3 | 0 | 0 | 0 | 0 | 0 | 0 | 0 | 0 | 0 | 0 | 0 | 0 | 1 | j | -j | -1 |
| | 1 | 0 | 0 | 1 | j | -j | -1 | 0 | 0 | 0 | 0 | 0 | 0 | 0 | 0 | 0 | 0 | 0 | 0 |
| | | 0 | 1 | 0 | 0 | 0 | 0 | 1 | j | -j | -1 | 0 | 0 | 0 | 0 | 0 | 0 | 0 | 0 |
| | | 0 | 2 | 0 | 0 | 0 | 0 | 0 | 0 | 0 | 0 | 1 | j | -j | -1 | 0 | 0 | 0 | 0 |
| | | 0 | 3 | 0 | 0 | 0 | 0 | 0 | 0 | 0 | 0 | 0 | 0 | 0 | 0 | 1 | j | -j | -1 |
| 1 | 0 | 1 | 0 | 0 | 0 | 0 | 0 | 0 | 0 | 0 | 0 | 0 | 0 | 0 | 0 | -j | j | 1 | -1 |
| | | 1 | 1 | -j | j | 1 | -1 | 0 | 0 | 0 | 0 | 0 | 0 | 0 | 0 | 0 | 0 | 0 | 0 |
| | | 1 | 2 | 0 | 0 | 0 | 0 | -j | j | 1 | -1 | 0 | 0 | 0 | 0 | 0 | 0 | 0 | 0 |
| | | 1 | 3 | 0 | 0 | 0 | 0 | 0 | 0 | 0 | 0 | -j | j | 1 | -1 | 0 | 0 | 0 | 0 |
| | 1 | 1 | 0 | 0 | 0 | 0 | 0 | 0 | 0 | 0 | 0 | 0 | 0 | 0 | 0 | -j | j | 1 | -1 |
| | | 1 | 1 | -j | j | 1 | -1 | 0 | 0 | 0 | 0 | 0 | 0 | 0 | 0 | 0 | 0 | 0 | 0 |
| | | 1 | 2 | 0 | 0 | 0 | 0 | -j | j | 1 | -1 | 0 | 0 | 0 | 0 | 0 | 0 | 0 | 0 |
| | | 1 | 3 | 0 | 0 | 0 | 0 | 0 | 0 | 0 | 0 | -j | j | 1 | -1 | 0 | 0 | 0 | 0 |

The code shown in Table 4 has the following main properties:
1) The orthogonal resources used for RS are fixed for each transmit antenna. This may mean less complexity in encoding in the transmitter.
2) The modulation symbols do not vary across slots. Indeed, for each transmit antenna, only one modulation symbol is transmitted at both slots.

Alternative Embodiment #2

TABLE 5

Alternative STRSD Code #2

| Ant. | Slot | RRes | DRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|---|
| | | | | | | | | Codewords 0 to 15 | | | | | | | | | | | |
| 0 | 0 | 0 | 0 | 1 | j | -j | -1 | 0 | 0 | 0 | 0 | 0 | 0 | 0 | 0 | 0 | 0 | 0 | 0 |
| | | 0 | 1 | 0 | 0 | 0 | 0 | 1 | j | -j | -1 | 0 | 0 | 0 | 0 | 0 | 0 | 0 | 0 |
| | | 0 | 2 | 0 | 0 | 0 | 0 | 0 | 0 | 0 | 0 | 1 | j | -j | -1 | 0 | 0 | 0 | 0 |
| | | 0 | 3 | 0 | 0 | 0 | 0 | 0 | 0 | 0 | 0 | 0 | 0 | 0 | 0 | 1 | j | -j | -1 |
| | 1 | 0 | 0 | 1 | j | -j | -1 | 0 | 0 | 0 | 0 | 0 | 0 | 0 | 0 | 0 | 0 | 0 | 0 |
| | | 0 | 1 | 0 | 0 | 0 | 0 | 1 | j | -j | -1 | 0 | 0 | 0 | 0 | 0 | 0 | 0 | 0 |
| | | 0 | 2 | 0 | 0 | 0 | 0 | 0 | 0 | 0 | 0 | 1 | j | -j | -1 | 0 | 0 | 0 | 0 |
| | | 0 | 3 | 0 | 0 | 0 | 0 | 0 | 0 | 0 | 0 | 0 | 0 | 0 | 0 | 1 | j | -j | -1 |
| 1 | 0 | 1 | 0 | 0 | 0 | 0 | 0 | 0 | 0 | 0 | 0 | 0 | 0 | 0 | 0 | -j | j | 1 | -1 |
| | | 1 | 1 | -j | j | 1 | -1 | 0 | 0 | 0 | 0 | 0 | 0 | 0 | 0 | 0 | 0 | 0 | 0 |
| | | 1 | 2 | 0 | 0 | 0 | 0 | -j | j | 1 | -1 | 0 | 0 | 0 | 0 | 0 | 0 | 0 | 0 |
| | | 1 | 3 | 0 | 0 | 0 | 0 | 0 | 0 | 0 | 0 | -j | j | 1 | -1 | 0 | 0 | 0 | 0 |
| | 1 | 1 | 0 | 0 | 0 | 0 | 0 | 0 | 0 | 0 | 0 | 0 | 0 | 0 | 0 | -j | 1 | j | -1 |
| | | 1 | 1 | -j | 1 | j | -1 | 0 | 0 | 0 | 0 | 0 | 0 | 0 | 0 | 0 | 0 | 0 | 0 |
| | | 1 | 2 | 0 | 0 | 0 | 0 | -j | 1 | j | -1 | 0 | 0 | 0 | 0 | 0 | 0 | 0 | 0 |
| | | 1 | 3 | 0 | 0 | 0 | 0 | 0 | 0 | 0 | 0 | -j | 1 | j | -1 | 0 | 0 | 0 | 0 |

The code shown in Table 5 is obtained from Table 4 by allowing the second slot of the second antenna to use a different QPSK symbol compared to the first slot. By applying this change the performance is improved. The first antenna still has commonality with PUCCH formats 1a/1b single antenna transmission in LTE Rel-8. The performance can be further improved by also changing the symbols on the second slot of the first antenna.

Component #3: Variable Rate Operation

Alternative Embodiment #3 codewords 0 to 7. Similarly, if 2 information bits are used, the information bits select from codewords 0 to 3. This means that resources 2 and 3 are never used for 2 information bit transmissions. Note that in the single information bit case, resources 1 and 2 are still used, even though only the first two columns are selected from. Using two resources ensures that the antennas of a UE do not interfere with each other, improving diversity reception at the base station.

Transmitting a fixed number of Ack/Nack bits will typically consume a fixed number of orthogonal resources for channel selection. However, if we use an embodiment of the

TABLE 6

Alternative STRSD Code #3

| Ant. | Slot | RRes | DRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|---|
| 0 | 0 | 0 | 0 | 1 | j | −j | −1 | 0 | 0 | 0 | 0 | 0 | 0 | 0 | 0 | 0 | 0 | 0 | 0 |
|   |   | 2 | 1 | 0 | 0 | 0 | 0 | 1 | j | −j | −1 | 0 | 0 | 0 | 0 | 0 | 0 | 0 | 0 |
|   |   | 0 | 2 | 0 | 0 | 0 | 0 | 0 | 0 | 0 | 0 | 1 | j | −j | −1 | 0 | 0 | 0 | 0 |
|   |   | 2 | 3 | 0 | 0 | 0 | 0 | 0 | 0 | 0 | 0 | 0 | 0 | 0 | 0 | 1 | j | −j | −1 |
|   | 1 | 0 | 0 | 1 | j | −j | −1 | 0 | 0 | 0 | 0 | 0 | 0 | 0 | 0 | 0 | 0 | 0 | 0 |
|   |   | 2 | 1 | 0 | 0 | 0 | 0 | 1 | j | −j | −1 | 0 | 0 | 0 | 0 | 0 | 0 | 0 | 0 |
|   |   | 0 | 2 | 0 | 0 | 0 | 0 | 0 | 0 | 0 | 0 | 1 | j | −j | −1 | 0 | 0 | 0 | 0 |
|   |   | 2 | 3 | 0 | 0 | 0 | 0 | 0 | 0 | 0 | 0 | 0 | 0 | 0 | 0 | 1 | j | −j | −1 |
| 1 | 0 | 3 | 0 | 0 | 0 | 0 | 0 | 0 | 0 | 0 | 0 | 0 | 0 | 0 | 0 | −j | j | 1 | −1 |
|   |   | 1 | 1 | −j | j | 1 | −1 | 0 | 0 | 0 | 0 | 0 | 0 | 0 | 0 | 0 | 0 | 0 | 0 |
|   |   | 1 | 2 | 0 | 0 | 0 | 0 | −j | j | 1 | −1 | 0 | 0 | 0 | 0 | 0 | 0 | 0 | 0 |
|   |   | 3 | 3 | 0 | 0 | 0 | 0 | 0 | 0 | 0 | 0 | −j | j | 1 | −1 | 0 | 0 | 0 | 0 |
|   | 1 | 3 | 0 | 0 | 0 | 0 | 0 | 0 | 0 | 0 | 0 | 0 | 0 | 0 | 0 | −j | 1 | j | −1 |
|   |   | 1 | 1 | −j | 1 | J | −1 | 0 | 0 | 0 | 0 | 0 | 0 | 0 | 0 | 0 | 0 | 0 | 0 |
|   |   | 1 | 2 | 0 | 0 | 0 | 0 | −j | 1 | j | −1 | 0 | 0 | 0 | 0 | 0 | 0 | 0 | 0 |
|   |   | 3 | 3 | 0 | 0 | 0 | 0 | 0 | 0 | 0 | 0 | 0 | −j | 1 | j | −1 | 0 | 0 | 0 |

The code shown in Table 6 has a 'nested property'. The table shows a 16-state code, corresponding to a 4 bit Ack/Nack transmission scenario. However, if only 2 or 3 Ack/Nack bits are to be transmitted, then a subcode with 4 or 8 codewords, respectively, can be chosen such that only 2 or 3 resources are used for transmission. In general, we use a code mapping wherein $2^N$ states of the code corresponding to N information bits utilize at most N orthogonal resources.

It is important to note that not all combinations of N bits will allow N orthogonal resources to be used. For example, the codewords in columns 1-4 of Table 6 use only two resources for Ack/Nack transmission. The same is true for columns 5-8. However, the last 8 columns occupy all 4 orthogonal resources. This aspect is described in further detail in Component #6: Alternatives compatible with partial resource allocation on component carriers.

Note that each codeword can be labeled with any combination of information bits, so long as each of the sixteen information bit combinations is used only once, and such that the codewords are still grouped as above. That is, if only 3 bits are to be communicated, then only codewords 0 to 7 may be used, but the values of the information bits $b_i$ need not be the ones shown in the second row of the tables, as long as only one information bit combination is used with each state, and each combination is used once.

A different number of codewords in the code presented in Table 6 occupy different orthogonal resources and antennas. This property can be exploited such that fewer orthogonal resources are used when a smaller number of information bits are used. If 3 information bits are used, the information bits select from codewords 0 to 7. This means that resource 3 is never used for either the reference signal or the data portion of 3 information bit transmissions, since it is always zero for STRSD code that has the 'nested' property, such as the alternative STRSD code of Table 6, it is possible to use a smaller number of orthogonal resources whenever 'Nack/DTX' is signaled. In this case, we set the information bits $b_i$ of this embodiment of the STRSD code to 0 to indicate a 'Nack/DTX'. Therefore, in this embodiment, we use a code mapping wherein $2^N$ states of the code corresponding to N information bits utilize at most N orthogonal resources, and the same value $b_i$ indicates Nack/DTX (that is, either a Nack or no grant was received) for the $i^{th}$ transport block.

LTE-Advanced carrier aggregation allows a UE to be configured to receive a set of carriers, and then to be activated (or deactivated) to receive (or cease reception of) one of its configured carriers. Because of this behavior, UEs that are configured for multiple downlink component carriers may not receive data on some of the carriers for relatively long periods of time. This means that orthogonal resources used to indicate Ack/Nack bits for the inactive carriers would essentially be wasted. Because the UE is activated to receive a component carrier using higher layer, including medium access control (MAC) layer signaling, both it and the eNB are aware of how many component carriers it is currently receiving, and in theory the number of Ack/Nack bits could be set to match the number of activated carriers. However, because the eNB and the UE can have a different understanding on when activation or deactivation happen due to an error in MAC signaling or due to the use of a deactivation timer, it may be preferable to always transmit an Ack/Nack bit for each transport block the UE is to receive on its configured component carriers. In this case, this embodiment will set the Ack/Nack information bits $b_i$ to 0 to indicate a 'Nack/DTX' for transport blocks of a deactivated component carrier, when the deactivated carrier is one of the UE's configured carriers.

Note that setting the Ack/Nack information bits $b_i$ to 0 to indicate a 'Nack/DTX' for a transport block of a deactivated component carrier when the deactivated carrier is one of the UE's configured carriers is also beneficial in cases where channel selection with transmit diversity is not used. Because the eNB knows how many transport blocks it transmits to the UE and how many carriers it has activated the UE to receive, it can know when a UE sets information bits b to 0 to indicate a 'Nack/DTX' for transport blocks of deactivated component carriers, and can therefore use a reduced number of Ack/Nack information bit combination hypotheses in its receiver. Because using a smaller number of bit combination hypotheses (matched to the number of possible Ack/Nack bit combinations actually in use by the UE) can allow more reliable reception at a given received SNR, constraining the Ack/Nack information bits $b_i$ to 0 to indicate a 'Nack/DTX' for a transport block of a deactivated component carrier can be used to reduce the required UE transmit power for Ack/Nack.

Alternative Embodiment #4

TABLE 7

Alternative STRSD Code #4

| Ant. | Slot | RRes | DRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|---|
| 0 | 0 | 0 | 0 | 1 | j | −j | −1 | 0 | 0 | 0 | 0 | 0 | 0 | 0 | 0 | 0 | 0 | 0 | 0 |
|   |   | 1 | 1 | 0 | 0 | 0 | 0 | 1 | j | −j | −1 | 0 | 0 | 0 | 0 | 0 | 0 | 0 | 0 |
|   |   | 2 | 2 | 0 | 0 | 0 | 0 | 0 | 0 | 0 | 0 | 1 | j | −j | −1 | 0 | 0 | 0 | 0 |
|   |   | 3 | 3 | 0 | 0 | 0 | 0 | 0 | 0 | 0 | 0 | 0 | 0 | 0 | 0 | 1 | j | −j | −1 |
|   | 1 | 0 | 0 | 1 | j | −j | −1 | 0 | 0 | 0 | 0 | 0 | 0 | 0 | 0 | 0 | 0 | 0 | 0 |
|   |   | 1 | 1 | 0 | 0 | 0 | 0 | 1 | j | −j | −1 | 0 | 0 | 0 | 0 | 0 | 0 | 0 | 0 |
|   |   | 2 | 2 | 0 | 0 | 0 | 0 | 0 | 0 | 0 | 0 | 1 | j | −j | −1 | 0 | 0 | 0 | 0 |
|   |   | 3 | 3 | 0 | 0 | 0 | 0 | 0 | 0 | 0 | 0 | 0 | 0 | 0 | 0 | 1 | j | −j | −1 |
| 1 | 0 | 1 | 0 | 0 | 0 | 0 | 0 | 0 | 0 | 0 | 0 | 0 | 0 | 0 | 0 | −j | j | 1 | −1 |
|   |   | 2 | 1 | −j | j | 1 | −1 | 0 | 0 | 0 | 0 | 0 | 0 | 0 | 0 | 0 | 0 | 0 | 0 |
|   |   | 3 | 2 | 0 | 0 | 0 | 0 | −j | j | 1 | −1 | 0 | 0 | 0 | 0 | 0 | 0 | 0 | 0 |
|   |   | 0 | 3 | 0 | 0 | 0 | 0 | 0 | 0 | 0 | 0 | −j | j | 1 | −1 | 0 | 0 | 0 | 0 |
|   | 1 | 1 | 0 | 0 | 0 | 0 | 0 | 0 | 0 | 0 | 0 | 0 | 0 | 0 | 0 | −j | 1 | j | −1 |
|   |   | 2 | 1 | −j | 1 | j | −1 | 0 | 0 | 0 | 0 | 0 | 0 | 0 | 0 | 0 | 0 | 0 | 0 |
|   |   | 3 | 2 | 0 | 0 | 0 | 0 | −j | 1 | j | −1 | 0 | 0 | 0 | 0 | 0 | 0 | 0 | 0 |
|   |   | 0 | 3 | 0 | 0 | 0 | 0 | 0 | 0 | 0 | 0 | −j | 1 | j | −1 | 0 | 0 | 0 | 0 |

The code shown in Table 7 has the property that for transmission on the $1^{st}$ antenna, data and RS use the same orthogonal resource. In this sense, Table 7 has some commonality with single antenna channel selection transmission.

Table 7 also has the nested property for 3 bits, but not for 2 bits. It uses 4 resources for 4 information bits, 3 resources for 3 information bits, but also uses 3 resources for 2 information bits.

Alternative Embodiment #5

TABLE 8

Alternative STRSD Code #5

| Ant. | Slot | RRes | DRes | 0000 | 0001 | 0010 | 0011 | 0100 | 0101 | 0110 | 0111 | 1100 | 1101 | 1110 | 1111 | 1000 | 1001 | 1010 | 1011 |
|---|---|---|---|---|---|---|---|---|---|---|---|---|---|---|---|---|---|---|---|
| 0 | 0 | 0 | 0 | 1 | j | −j | −1 | 0 | 0 | 0 | 0 | 0 | 0 | 0 | 0 | 0 | 0 | 0 | 0 |
|   |   | 2 | 1 | 0 | 0 | 0 | 0 | 1 | j | −j | −1 | 0 | 0 | 0 | 0 | 0 | 0 | 0 | 0 |
|   |   | 0 | 2 | 0 | 0 | 0 | 0 | 0 | 0 | 0 | 0 | 1 | j | −j | −1 | 0 | 0 | 0 | 0 |
|   |   | 2 | 3 | 0 | 0 | 0 | 0 | 0 | 0 | 0 | 0 | 0 | 0 | 0 | 0 | 1 | j | −j | −1 |
|   | 1 | 0 | 0 | 1 | j | −j | −1 | 0 | 0 | 0 | 0 | 0 | 0 | 0 | 0 | 0 | 0 | 0 | 0 |
|   |   | 2 | 1 | 0 | 0 | 0 | 0 | 1 | j | −j | −1 | 0 | 0 | 0 | 0 | 0 | 0 | 0 | 0 |
|   |   | 0 | 2 | 0 | 0 | 0 | 0 | 0 | 0 | 0 | 0 | 1 | j | −j | −1 | 0 | 0 | 0 | 0 |
|   |   | 2 | 3 | 0 | 0 | 0 | 0 | 0 | 0 | 0 | 0 | 0 | 0 | 0 | 0 | 1 | j | −j | −1 |
| 1 | 0 | 3 | 0 | 0 | 0 | 0 | 0 | 0 | 0 | 0 | 0 | 0 | 0 | 0 | 0 | −j | j | 1 | −1 |
|   |   | 1 | 1 | −j | j | 1 | −1 | 0 | 0 | 0 | 0 | 0 | 0 | 0 | 0 | 0 | 0 | 0 | 0 |
|   |   | 1 | 2 | 0 | 0 | 0 | 0 | −j | j | 1 | −1 | 0 | 0 | 0 | 0 | 0 | 0 | 0 | 0 |
|   |   | 3 | 3 | 0 | 0 | 0 | 0 | 0 | 0 | 0 | 0 | −j | j | 1 | −1 | 0 | 0 | 0 | 0 |
|   | 1 | 3 | 0 | 0 | 0 | 0 | 0 | 0 | 0 | 0 | 0 | 0 | 0 | 0 | 0 | −j | j | 1 | −1 |
|   |   | 1 | 1 | −j | j | 1 | −1 | 0 | 0 | 0 | 0 | 0 | 0 | 0 | 0 | 0 | 0 | 0 | 0 |
|   |   | 1 | 2 | 0 | 0 | 0 | 0 | −j | j | 1 | −1 | 0 | 0 | 0 | 0 | 0 | 0 | 0 | 0 |
|   |   | 3 | 3 | 0 | 0 | 0 | 0 | 0 | 0 | 0 | 0 | −j | j | 1 | −1 | 0 | 0 | 0 | 0 |

The code shown in Table 8 is obtained from Table 6 by changing the data symbols in slot 1 (the second slot) to be the same as those of slot 0 (the first slot). This has the benefit of being more similar to Rel-8 PUCCH slot structure, since Rel-8 uses the same data symbol in both slots of PUCCH format 1/1a/1b. This similarity to Rel-8 slot structure would mean new devices supporting this embodiment would not need to be changed as much from the Rel-8 implementations.

This alternative slot structure this embodiment is shown in FIG. 8. Here, as in Rel-8, as single data symbol, 'd' is used for both slots. Furthermore, unlike FIG. 7, for a given STRSD codeword, one orthogonal resource is always used in both slots for the data symbols and one orthogonal resource is used for the reference symbols. Note that in the case cyclic shift hopping is used, the cyclic shifts may vary, and therefore the orthogonal resource may vary, with the symbol instant in time, but the hopping sequences will not change between slots in response to a change in the information bits.

Summary of STRSD Code Characteristics

To summarize, the key characteristics of the STRSD codes described herein are:
1) For a given number of information bits, the same number of orthogonal resources are used for single antenna and for the transmit diversity code.
2) Transmissions are on a subset of the total orthogonal resources allocated to them
   a. Transmissions are on two distinct orthogonal resources in each slot
   b. Two antennas always transmit for each codeword
3) The RS resource varies with the data
   a. A group of codewords is associated with one resource that is used for the RS
      i. The size of the group=(number of codewords)/(number of RS resources used on each antenna)
4) The resources used for data symbols or for RS symbols on each of the two antennas in one slot are always different;
5) The codewords are transmitted in two slots
   a. The combination of modulation symbols on the antennas can be different between the two symbols instants for a codeword
   b. For a codeword, a modulation symbol on an antenna can be (but is not always) different between the two slots for the same antenna.
6) Each QPSK symbol is used an equal number of times on each orthogonal resource.
   a. For example, our 16 state code uses $\{1, j, -1, \text{and } j\}$ 4 times each for each orthogonal resource.

Additional characteristics of the code include:
1. For the 4-bit codebook, there are 16 state corresponding to 16 codewords;
   a. The 16 codewords in the codebook are divided into 4 groups, each group has 4 codewords;
2. The 4 codewords inside each group have same resource allocation for data symbols and RS symbols.
3. The 4 codewords inside each group are distinguished by using 4 different QPSK modulation symbols $\{1,-1,j,-j\}$ for the data symbols to achieve a maximum diversity gain.
   a. The distances (Euclidean distance) between the codewords inside each group are balanced by swapping the QPSK modulation symbols in each row inside the group.
   b. Rotating the elements of one row of the codebook in the complex plane for a certain angle (e.g. multiply $j^n$ to each elements in a row) will not change the codebook distance property.
   c. A permutation may be applied to four rows of a codeword. If the same permutation applies to all codewords, the codebook distance properties will not change.
   d. Different permutations may be applied to codewords in different groups without changing the codebook distance properties.
4. Between different codeword groups, the resources allocated for data symbol are rotated. For example, in the codebooks above, codeword group 1 use resources $\{0,1\}$, group 2 use $\{1,2\}$, group 3 use $\{2,3\}$, and group 4 use $\{3,0\}$. Between every two adjacent groups, only one resource allocation for data symbols is overlapped. In turn, combined with RS resource allocation, a maximum diversity gain can be achieved.
   a. Any reordering (permutation) of orthogonal resources does not change the codebook distance properties. For example, if the orthogonal resources are reordered as (0, 3, 2, 1), in the codebooks described above, group 1 use resources (0,3), group 2 use resources (3,2), group 3 use resources (2,1), and group 4 uses resources (1,0).
   b. Groups can be also reordered without any change any codebook distance properties.
5. For RS resource allocation for non-nested codebook, to maximize and to balance the codeword distance,
   a. The resource allocated for the RS for any two adjacent codeword groups are completely different to compensate the resource allocation overlap for data symbols.
   b. The resource allocated for the RS for any two NON-adjacent codeword groups may have overlap (i.e. there may have same resource allocated to RS in different non-adjacent codeword group, which don't have overlap in data resource allocation).
6. For RS resource allocation for nested codebook, to maximize and to balance the codeword distance,
   a. For first 4 codewords, totally 2 resources are used for both data and RS symbols.
   b. For first 8 codewords, totally 3 resources are used for both data and RS symbols.
   c. For all 16 codewords, totally 4 resources are used for both data and RS symbols.
   d. The resources allocation for RS in different codeword groups, adjacent or non-adjacent, may have overlap to achieve the nested property. The performance losses are minimized in the codebook design.

Component #4: Customized Codebook Sizes

Because it can explicitly signal DTX in some cases, Rel-8 TDD Ack/Nack can be configured to operate with a number of HARQ states that is not an integer power of two. For example, consider the case where 3 HARQ processes are used. It is based on Table 10.1-3 of 3GPP TS 36.213 v8.8.0, "3rd Generation Partnership Project; Technical Specification Group Radio Access Network; Evolved Universal Terrestrial Radio Access (E-UTRA); Physical Layer Procedures (Release 8)", September, 2009, but with the states numbered for convenience. Note that b (0), b (1) indicates which QPSK symbol to use and that $n_{PUCCH}^{(1)}$ indicates the orthogonal resource to transmit the QPSK symbol on.

Transmission of ACK/NACK multiplexing for M=3

TABLE 9

Rel-8 TDD Ack/Nack Using Channel Selection Over 3 Orthogonal Resources

| HARQ-ACK(0), HARQ-ACK(1), HARQ-ACK(2) | $n_{PUCCH}^{(1)}$ | b (0), b (1) | State |
|---|---|---|---|
| ACK, ACK, ACK | $n_{PUCCH,2}^{(1)}$ | 1, 1 | 0 |
| ACK, ACK, NACK/DTX | $n_{PUCCH,1}^{(1)}$ | 1, 1 | 1 |
| ACK, NACK/DTX, ACK | $n_{PUCCH,0}^{(1)}$ | 1, 1 | 2 |
| ACK, NACK/DTX, NACK/DTX | $n_{PUCCH,0}^{(1)}$ | 0, 1 | 3 |
| NACK/DTX, ACK, ACK | $n_{PUCCH,2}^{(1)}$ | 1, 0 | 4 |
| NACK/DTX, ACK, NACK/DTX | $n_{PUCCH,1}^{(1)}$ | 0, 0 | 5 |
| NACK/DTX, NACK/DTX, ACK | $n_{PUCCH,2}^{(1)}$ | 0, 0 | 6 |
| DTX, DTX, NACK | $n_{PUCCH,2}^{(1)}$ | 0, 1 | 7 |
| DTX, NACK, NACK/DTX | $n_{PUCCH,1}^{(1)}$ | 1, 0 | 8 |
| NACK, NACK/DTX, NACK/DTX | $n_{PUCCH,0}^{(1)}$ | 1, 0 | 9 |
| DTX, DTX, DTX | N/A | N/A | 'All DTX' |

Here, 10 different states are needed, not counting the all DTX state. (The embodiment using Table 10 handles the 'All DTX' state in the same way as Rel-8: by not transmitting on the allocated resource.) It is possible to generate this 10 state case using the Table 10 (which replaces the resource and QPSK symbol selections in Table 9):

TABLE 10

10 State STRSD Code

| | | | | Codewords 0 to 9 | | | | | | | | | |
|---|---|---|---|---|---|---|---|---|---|---|---|---|---|
| Ant. | Slot | RRes | DRes | 0 | 1 | 2 | 3 | 4 | 5 | 6 | 7 | 8 | 9 |
| 0 | 0 | 0 | 0 | 1 | j | -j | -1 | 0 | 0 | 0 | 0 | 0 | 0 |
| | | 2 | 1 | 0 | 0 | 0 | 0 | 1 | j | -j | 0 | 0 | 0 |
| | | 0 | 2 | 0 | 0 | 0 | 0 | 0 | 0 | 0 | 1 | j | -1 |
| | 1 | 0 | 0 | 1 | j | -j | -1 | 0 | 0 | 0 | 0 | 0 | 0 |
| | | 2 | 1 | 0 | 0 | 0 | 0 | 1 | j | -j | 0 | 0 | 0 |
| | | 0 | 2 | 0 | 0 | 0 | 0 | 0 | 0 | 0 | 1 | j | -1 |
| 1 | 0 | 2 | 0 | 0 | 0 | 0 | 0 | 0 | 0 | 0 | -j | j | -1 |
| | | 1 | 1 | -j | j | 1 | -1 | 0 | 0 | 0 | 0 | 0 | 0 |
| | | 1 | 2 | 0 | 0 | 0 | 0 | -j | j | -1 | 0 | 0 | 0 |
| | 1 | 2 | 0 | 0 | 0 | 0 | 0 | 0 | 0 | 0 | -j | 1 | -1 |
| | | 1 | 1 | -j | 1 | j | -1 | 0 | 0 | 0 | 0 | 0 | 0 |
| | | 1 | 2 | 0 | 0 | 0 | 0 | -j | 1 | j | 0 | 0 | 0 |

This code is constructed by modifying a subset of the codewords of the embodiment in Table 2. We first select the codewords 0 through 6, 12, 13, and 14, where the codeword indices are the decimal version of the information bit combinations. In other words, we select the first 7, and the $8^{th}$, $9^{th}$, and $10^{th}$ columns of Table 2. We then reassign all data symbols on antenna 1 in the last 3 codewords of the new code (that is, codewords 7, 8, and 9 in Table 10) to be transmitted on orthogonal resource 0 rather than orthogonal resource 3. In this way, the data now occupy only 3 orthogonal resources, rather than 4, improving the spectral efficiency of the code. Similarly, we assign 3 orthogonal resources to be used for the reference signals, so the total usage of orthogonal resources for both data and reference signals is 3.

Note that the new codewords are not unique, so there may be other similarly performing codewords that could be added. Furthermore, the mapping to the HARQ states is also flexible: the mapping given here could be reordered, likely providing codes with good performance.

Component #5: PUCCH Resource Allocation

Some standardized behavior is needed to associate orthogonal resource with the UE antennas, in the form of a rule or explicit signaling. There could be a number of approaches to determine the required orthogonal resources (i.e. PUCCH resource when used for the LTE standard) as follows.

Since the orthogonal resource to be used by the UE for its PUCCH carrying Ack/Nack can be indicated using scheduling grants, approaches are possible using either or both the PCC and SCC.

Approach 1: all PUCCH resources are explicitly allocated.
Approach 2: all PUCCH resources are implicitly allocated.
Approach 3: at least one PUCCH resource is implicitly allocated when PDCCH is transmitted on the downlink (DL) PCC and the remaining PUCCH resource is explicitly allocated.

Approach 1:

If explicit signaling is used, the eNB can assign each PUCCH resource to each antenna explicitly. For example, if 4 PUCCH resources are needed for channel selection, we set:

$n_{PUCCH,0}^{(1)}$=PUCCH resource,0

$n_{PUCCH,1}^{(1)}$=PUCCH resource,1

$n_{PUCCH,2}^{(1)}$=PUCCH resource,2

$n_{PUCCH,3}^{(1)}$=PUCCH resource,3

PUCCH resources (0, . . . 3) are signaled by higher layer signaling or by physical signaling using PDCCH.

The following is the example of RRC signaling for PUCCH resources.

N1-PUCCH-AN-ChannelSelectionList ::= SEQUENCE (SIZE (1..4)) OF INTEGER (0..2047)

N1-PUCCH-AN-ChannelSelectionList
List of parameter: $n_{PUCCH}^{(1)}$ see TS 36.213, [23, 10.1].

In another embodiment, the eNB signals the PUCCH resource for $n_{PUCCH,0}^{(1)}$ and the other PUCCH resources are derived with $n_{PUCCH,0}^{(1)}$ and offset values.

$$n_{PUCCH,0}^{(1)} = \text{PUCCH resource},0$$

$$n_{PUCCH,i}^{(1)} = n_{PUCCH,0}^{(1)} + \Delta_i$$

$\Delta_i$ can be predefined or configured by higher layer signaling.

In another embodiment, the eNB signals the set of candidate the PUCCH resources using higher layer signaling, and then the exact PUCCH resources are signaled by an Ack/Nack resource indicator (ARI) in a DL grant. For example, if 2 bits are defined for ARI, a set of 4 combinations of candidate PUCCH resources can be signaled by higher layers and one combination of the set to be used for the channel selection resources is indicated by ARI.

When the ARI bits are included in a DL grant corresponding to PDSCH of an SCC, the UE may not be able to know the exact PUCCH resource when it misses the DL grant for the PDSCH of the SCC. One solution for this case is to indicate the same PUCCH resource in the DL grants for the PDSCH of both SCC and PCC when both SCC and PCC are scheduled for a UE. In this way, if only SCC or PCC is received, the same resource is used regardless of whether the UE receives grants on both SCC and PCC or not. In order to be as flexible as possible, it is desirable to allow eNB to indicate different PUCCH resource in the DL grants for the PDSCHs of the SCC and PCC. If the UE receives both, it will need to choose one of the sets of resource indicated by either DL grant for the PDSCH of SCC or PCC. Therefore, in one embodiment, when the UE receives DL grants for the PDSCHs of the SCC and the PCC, it will select the resource indicated by the DL grant for the PDSCH of either the PCC or the SCC according to a predetermined rule. Since in this approach, explicit signaling is used, PCC will likely have less capacity to carry explicit indications in its DL grants, the preferred rule is to use the resource indicated by SCC when both grants are received. In an alternative embodiment, higher layer signaling is used to indicate to the UE if the DL grant for PDSCH of SCC or on PCC should be used to determine the PUCCH resource.

In another embodiment when ARI bits are included in a DL grant corresponding to the PDSCH of an SCC, when the UE receives a DL grant from PCC, the UE can transmit on predetermined default PUCCH resources using channel selection. In yet another alternative embodiment, the UE can transmit Ack/Nack using Rel-8 PUCCH resource not applying the channel selection.

Approach 2:

As will be discussed in more detail below, in Rel-8, a UE determines which PUCCH resource to use for Ack/Nack transmission implicitly based on the location of its downlink grant in the PDCCH resources. As is known to those of skill in the art, LTE PDCCH resources are comprised of control channel elements (CCEs), and a PDCCH occupies one or several consecutive CCEs. The location of a PDCCH in a cell's PDCCH resources can therefore be identified by the index of the PDCCH's first occupied CCE. The lowest CCE index used to construct the PDCCH is the location of a PDCCH.

In an embodiment, PUCCH resources of all configured CCs are reserved in the UL PCC and the PUCCH resource for channel selection can be derived by using the first CCE index of all detected PDCCHs. This is similar to the method used in Release-8 TDD. However, to support the multiple carriers and the multiple antennas, the method should be modified as follows.

For a PDSCH transmission on CC i or a PDCCH indicating downlink semi-persistent scheduling (SPS) release of CC i in sub-frame n−k, the Ack/Nack resource $n_{PUCCH,i}^{(1)} = (M-i-1) \times N_{p,i} + i \times N_{p,i+1} + n_{CCE,i} + N_{PUCCH}^{(1)}$, where P is selected from $\{0, 1, 2, 3\}$ such that $N_{p,i} \leq n_{CCE,i} < N_{p,i+1}$, $N_{p,i} = \max\{0, \lfloor [N_{RB,i}^{DL} \times (N_{sc}^{RB} \times p - 4)]/36 \rfloor\}$, M is the number of configured CCs (or the number of CCs having the reserved PUCCH resources in UL PCC), $n_{CCE,i}$ is the index of the first CCE used for transmission of the corresponding PDCCH in CC i and $N_{PUCCH}^{(1)}$ is configured by higher layers. This method is applicable when the number of required resources is the same as the number of configured CCs.

In another embodiment, a different PUCCH resource allocation method can be used when the number of required PUCCH resources is larger than the number of configured CCs to support two transport blocks in DL. In this case, the PUCCH resources corresponding to the number of detected PDCCHs are derived with the first CCE index of detected PDCCHs and the remaining PUCCH resources are allocated by using the offset on top of the first CCE index of detected PDCCHs. Simply, the remaining PUCCH resources can be considered as the PUCCH resource for the second antenna. For example, the following equation can be used to determine all PUCCH resources.

$$\text{For } n_{PUCCH,0}^{(1)}, n_{PUCCH,2}^{(1)} \ldots n_{PUCCH,i*2+t}^{(1)} = (M-i-1) \times N_{p,i} + i \times N_{p,i+1} + n_{CCE,i} + N_{PUCCH}^{(1)}$$

$$\text{For } n_{PUCCH,1}^{(1)}, n_{PUCCH,3}^{(1)} \ldots n_{PUCCH,i*2+t}^{(1)} = (M-i-1) \times N_{p,i} + i \times N_{p,i+1} + n_{CCE,i} + N_{PUCCH}^{(1)} + \Delta_{t,i}$$

Where $\Delta_{t,i}$ is the cyclic shift offset to allocate the remaining PUCCH resources. An example way of defining the cyclic shift could be predefined as a fixed value or signaled by higher layers. An example fixed value can be $\Delta_{t,i} = 1$.

In another embodiment, two PDCCHs are transmitted on PCC when cross carrier scheduling is enabled. In this case, the PUCCH resources corresponding to the number of detected PDCCHs are derived with the first CCE index of detected PDCCHs and the remaining PUCCH resources are allocated by using the offset on top of the first CCE index of detected PDCCHs. Simply, the remaining PUCCH resources can be considered as the PUCCH resource for the second antenna. For example, the following equation can be used to determine all PUCCH resources.

$$\text{For } n_{PUCCH,0}^{(1)} : n_{PUCCH,0}^{(1)} = n_{CCE,0} + N_{PUCCH}^{(1)}$$

$$\text{For } n_{PUCCH,1}^{(1)} : n_{PUCCH,1}^{(1)} = n_{CCE,0} + N_{PUCCH}^{(1)} + \Delta_1$$

$$\text{For } n_{PUCCH,2}^{(1)} : n_{PUCCH,2}^{(1)} = n_{CCE,1} + N_{PUCCH}^{(1)}$$

$$\text{For } n_{PUCCH,3}^{(1)} : n_{PUCCH,3}^{(1)} = n_{CCE,1} + N_{PUCCH}^{(1)} + \Delta_2$$

Where $n_{CCE,0}$ and $n_{CCE,1}$ are the first CCE index of the detected PDCCHs and $\Delta_1$, $\Delta_2$ are the cyclic shift offset to allocate the remaining PUCCH resources. An example way of defining the cyclic shift could be predefined as a fixed value or signaled by higher layers. Example fixed values can be $\Delta_1 = \Delta_2 = 1$.

Approach 3:

In another embodiment, if the PUCCH resource is implicitly allocated for PDCCH transmitted on a certain CC, the corresponding PUCCH resource can be derived with the implicit method and the eNB can explicitly signal the remaining PUCCH resources. For example if we define:

$n_{PUCCH,0}^{(1)} =$ PUCCH resource determined by the first CCE index of the PDCCH transmitted on PCC $n_{PUCCH,1}^{(1)} =$ PUCCH resource,1

$n_{PUCCH,2}^{(1)} =$ PUCCH resource,2

$n_{PUCCH,3}^{(1)} =$ PUCCH resource,3

Then if two PUCCH resources can be implicitly allocated with one PDCCH, $n_{PUCCH,0}^{(1)}$ and $n_{PUCCH,1}^{(1)}$ can be allocated by the first CCE index of the PDCCH transmitted on the PCC and an offset, $\Delta_i$, as follows:

$n_{PUCCH,0}^{(1)}$=PUCCH resource determined by the first CCE index of the PDCCH transmitted on PCC $n_{PUCCH,1}^{(1)}=n_{PUCCH,0}^{(1)}+\Delta_i$ where is predefined or configured by higher layer signaling. An example predefined value is $\Delta_i=1$.

$n_{PUCCH,2}^{(1)}$=PUCCH resource,2 (explicitly signaled)

$n_{PUCCH,3}^{(1)}$=PUCCH resource,3 (explicitly signaled)

For the explicit PUCCH resources, the eNB signals the set of candidate PUCCH resources and the exact PUCCH resources are signaled by ARI (Ack/Nack resource indicator) in a DL grant. For example, if 2 bits are defined for ARI, a set of 4 combinations of candidate PUCCH resources can be signaled by higher layers and one combination of the set to be used for the channel selection resources is indicated by ARI. When ARI bits are included in a DL grant for PDSCH of an SCC, the UE may not be able to know the exact PUCCH resource when the UE misses the DL grant for PDSCH of the SCC. In the case when the UE receives a DL grant for PDSCH of its PCC, the UE can transmit on predetermined default PUCCH resources using channel selection. Alternatively, the UE can transmit Ack/Nack on Rel-8 PUCCH resource not applying the channel selection.

In another embodiment where ARI is included in DL grant for PDSCH of an SCC, the ARI indicates the values of $n_{PUCCH,2}^{(1)}$ and $n_{PUCCH,3}^{(1)}$. If a DL grant for PDSCH of the SCC is not correctly received, the UE will set two of the Ack/Nack information bits $b_m$ and $b_n$ corresponding to the transport block(s) scheduled by the SCC to the Ack/DTX state, such that it will use less orthogonal resource, as described with reference to a variable rate STRSD embodiment using Table 6, and it will not transmit on the orthogonal resource indexed by $n_{PUCCH,2}^{(1)}$ and $n_{PUCCH,3}^{(1)}$. For example, when 4 Ack/Nack bits are to be transmitted for two component carriers, and when the SCC Ack/Nack bits correspond to bits $b_2$ and $b_3$, when SCC is not received, the UE will set bits $b_2$ and $b_3$ to 0, and so the UE will only select from orthogonal resources 0 and 1.

The association of the PUCCH resource and the location of the downlink grant is time varying on a slot-by-slot basis in Rel-8 (that is, it follows a slot-by-slot 'hopping pattern'). This structure allows efficient orthogonal resource sharing. Since the number of Ack/Nack information bits the UE may transmit in a given subframe may vary, the amount of orthogonal resources it needs varies as well. eNB knows the number of transport blocks it schedules to each UE, and can therefore determine how many resources each UE will need at each subframe. By controlling each location of the UEs' downlink grants, eNB can dynamically allocate orthogonal resources to the UEs without conflict, even when the number of resources each UE uses varies.

Component #6: Alternatives Compatible with Partial Resource Allocation on Component Carriers The STRSD code of Table 6 allows to N information bits utilize at most N orthogonal resources. However, it does not allow any two pairs of information bits to use two orthogonal resources. For example, if $b_2$ and $b_3$ are both 0, then any of the four data resources may be transmitted upon, depending on the values of $b_o$ and $b_1$. In the context of carrier aggregation where there is a PCC and an SCC, two of four information bits may be associated the PCC and the other two with the SCC. Furthermore, the grants for PCC can indicate the values of two of the four orthogonal resources, and the grant for SCC can indicate the values of the other two orthogonal resources. In this case, if a grant for either PCC or SCC is not received, then the UE will not know the values of two of the orthogonal resources it may use for PUCCH transmission, and therefore could not transmit on two of the resources. If the STRSD code is such that two of the information bits use all four orthogonal resources, but the UE can only transmit on two of the resources, then some alternative behavior is needed. We therefore consider two alternative embodiments: one using default resources and another using a modified STRSD code that supports resource and information bit paired selection.

In another alternative embodiment, the eNB explicitly signals one or more default orthogonal resources using higher layer signaling. When the UE does not receive a grant that contains the value of one or more orthogonal resources, and the codeword to be transmitted uses one or more of the orthogonal resources that would have been contained in the grant, the UE transmits the STRSD codeword using the default resources.

In the alternative embodiment of Table 11 below, we support pair wise resource allocation when two of the resources are indicated by the PDCCH for PDSCH of PCC and the other resources are indicated by the PDCCH for PDSCH of an SCC. Orthogonal resources 0 and 1 are determined by PDCCH for PDSCH of the PCC, and orthogonal resources 2 and 3 are determined by PDCCH for PDSCH of the SCC. Furthermore, we assume that $b_0$ and $b_1$ correspond to the Ack/Nack bits for PDSCH of the PCC and $b_2$ and $b_3$ correspond to the Ack/Nack bits for PDSCH of the SCC. If the grant on the PDCCH for PDSCH of either PCC or SCC is not received, then either b0 and b1 or b2 and b3 will be zero (DTX). For $(b_3,b_2)=(0,0)$ resources 0 and 1 are always used. For $(b_0,b_1)=(0,0)$ resources 2 and 3 are used except when $(b_2,b_3)=(0,0)$. In this case $(b_0,b_1)$ and $(b_2,b_3)$ are pairs of Nacks or DTXs. Whenever the Ack/Nack bits for PDSCH of PCC is Nacks, then we know resources 0 and 1. When the Ack/Nack bits for PDSCH of PCC is DTXs and the Ack/Nack bits for PDSCH of SCC is DTXs, we have no problem, since the UE will not transmit (i.e. DTXs) any resources anyway. When the Ack/Nack bits for PDSCH of PCC is DTXs, but the Ack/Nack bits for PDSCH of SCC is Nacks, we don't know resources 0 and 1, but need to transmit on them. A simple solution to this problem is to DTX on all resources if a grant is not received for PDSCH of PCC and when the Ack/Nack bits for PDSCH of SCC are Nacks. Therefore, in an alternative embodiment, the STRSD code of Table 11 is used, and when the UE does not receive a grant for PDSCH of PCC but has Nacks for all transport blocks on SCC, it does not transmit Ack/Nack on PUCCH.

TABLE 11

Resource and Information Bit Paired Selection

Codewords 0 to 15
Information bits: $b_3b_2b_1b_0$

| Ant | Slot | RRes | DRes | 0000 | 0001 | 0010 | 0011 | 1101 | 0101 | 0110 | 0111 | 1100 | 0100 | 1000 | 1111 | 1110 | 1001 | 1010 | 1011 |
|---|---|---|---|---|---|---|---|---|---|---|---|---|---|---|---|---|---|---|---|
| 0 | 0 | 0 | 0 | 1 | j | -j | -1 | 0 | 0 | 0 | 0 | 0 | 0 | 0 | 0 | 0 | 0 | 0 | 0 |
|   |   | 2 | 1 | 0 | 0 | 0 | 0 | 1 | j | -j | -1 | 0 | 0 | 0 | 0 | 0 | 0 | 0 | 0 |
|   |   | 2 | 2 | 0 | 0 | 0 | 0 | 0 | 0 | 0 | 0 | 1 | j | -j | -1 | 0 | 0 | 0 | 0 |
|   |   | 0 | 3 | 0 | 0 | 0 | 0 | 0 | 0 | 0 | 0 | 0 | 0 | 0 | 0 | 1 | j | -j | -1 |
|   | 1 | 0 | 0 | 1 | j | -j | -1 | 0 | 0 | 0 | 0 | 0 | 0 | 0 | 0 | 0 | 0 | 0 | 0 |
|   |   | 2 | 1 | 0 | 0 | 0 | 0 | 1 | j | -j | -1 | 0 | 0 | 0 | 0 | 0 | 0 | 0 | 0 |
|   |   | 2 | 2 | 0 | 0 | 0 | 0 | 0 | 0 | 0 | 0 | 1 | j | -j | -1 | 0 | 0 | 0 | 0 |
|   |   | 0 | 3 | 0 | 0 | 0 | 0 | 0 | 0 | 0 | 0 | 0 | 0 | 0 | 0 | 1 | j | -j | -1 |
| 1 | 0 | 3 | 0 | 0 | 0 | 0 | 0 | 0 | 0 | 0 | 0 | 0 | 0 | 0 | 0 | -j | j | 1 | -1 |
|   |   | 1 | 1 | -j | j | 1 | -1 | 0 | 0 | 0 | 0 | 0 | 0 | 0 | 0 | 0 | 0 | 0 | 0 |
|   |   | 1 | 2 | 0 | 0 | 0 | 0 | -j | j | 1 | -1 | 0 | 0 | 0 | 0 | 0 | 0 | 0 | 0 |
|   |   | 3 | 3 | 0 | 0 | 0 | 0 | 0 | 0 | 0 | 0 | -j | j | 1 | -1 | 0 | 0 | 0 | 0 |
|   | 1 | 3 | 0 | 0 | 0 | 0 | 0 | 0 | 0 | 0 | 0 | 0 | 0 | 0 | 0 | -j | 1 | j | -1 |
|   |   | 1 | 1 | -j | 1 | j | -1 | 0 | 0 | 0 | 0 | 0 | 0 | 0 | 0 | 0 | 0 | 0 | 0 |
|   |   | 1 | 2 | 0 | 0 | 0 | 0 | -j | 1 | j | -1 | 0 | 0 | 0 | 0 | 0 | 0 | 0 | 0 |
|   |   | 3 | 3 | 0 | 0 | 0 | 0 | 0 | 0 | 0 | 0 | -j | 1 | j | -1 | 0 | 0 | 0 | 0 |

The alternative embodiment of Table 11 is constructed by starting with the STRSD code of Table 6, but changing the data and reference symbol resources and their association with the information bits such that:

1. When a first and a second information bit are both zero, a first and a second orthogonal resource are both transmitted in a subframe.
2. When a third and a fourth information bit are both zero, but the first and the second information bit are not zero, a third and a fourth orthogonal resource are both transmitted in the subframe.
3. When the third and the fourth information bit are both zero, and the first and the second information bit are both zero, and the UE does not receive a message indicating the first and second orthogonal resources it can transmit upon in the subframe, the UE does not transmit the Ack/Nack message in the subframe.

More particularly, Table 11 is constructed from Table 6 by changing the orthogonal resource associated with the information bit combinations in columns 9 through 12 for antenna 0 on the information bit combinations in columns 13 through 16 for antenna 0. In other words, the cell in the 'RRes' column, row 3 is swapped with that of row 4, and the cell in row 7 is swapped with row 8. Furthermore, the information bits in the fifth column are now '1101' instead of '0100', the tenth column has '0100' instead of '1101', the eleventh column has '1000' instead of '1110', and the thirteenth column has '1110' instead of '1000'.

The systems and methods disclosed herein have the following benefits:
  They provide diversity gain but do not require use of addition orthogonal resources to support Tx Diversity, and therefore allow more user terminals (UEs) to be multiplexed and operate on the same PUCCH.
  A variable number of information bits can be supported such that when fewer information bits are transmitted, fewer orthogonal resources are used.
  HARQ schemes that require codebooks with sizes that are not powers of two can be supported.
  It is backward compatible with Rel-8 PUCCH operation, using the same set of orthogonal resources as Rel-8, which allows it to be multiplexed into resource blocks containing Rel-8 PUCCH transmissions.
  The method provides some coding gain.

Some embodiments of the disclosure can be implemented using a combination of resource coding and modulation coding techniques. The techniques contemplated herein consider codeword groups (CGs) and sub-codewords. Herein, a CG is defined as a set of four codewords that use the same orthogonal resource mapping, but different modulation symbols. Also, a sub-codeword is set of data and reference symbols (and their corresponding orthogonal resources) transmitted on one antenna in one slot, and is represented for antenna index t and slot index s as the vector $x_t^s$. Furthermore, we use the notation that lower case boldface letters are used to represent vectors and $(.)^H$ denotes the Hermitian transpose.

In resource coding, the objective is to determine the orthogonal resources for different CGs such that the full diversity gain is exploited and a high coding gain is achieved. This embodiment can be implemented using a relationship where for any pair of codewords x and $\hat{x}$ belonging to different CGs, any sub-codeword of x at a slot s shares at most one resource (data or RS) with at most one sub-codeword of $\hat{x}$ in the same slot. In other words, $$|\hat{x}_t^{s^H} x_k^s| \neq 0 \rightarrow |\hat{x}_{t'}^{s^H} x_{k'}^s| = |\hat{x}_{t'}^{s^H} x_k^s| = 0$$

With this condition and for a maximum likelihood receiver, the coding gain can be characterized by the distance between codewords which is defined as $$d(x,\hat{x}) = \prod_{s=1}^{2} \prod_{t=1}^{2} \left( 49 - \sum_{k=1}^{2} |\hat{x}_k^{s^H} x_t^s|^2 \right)$$

Table 12 is an illustration of an embodiment for systematic resource coding. In this table, each cell of a row indicates an orthogonal resource used in a code group. The columns indicate the resources used for data, reference signal, and on which antenna and slot they are to be used. For example, in the first slot, code group 3 uses orthogonal resources 2 and 3, for antennas 1 and 2, respectively, to transmit data symbols. Also in the first slot, code group 3 uses orthogonal resources 0 and 1, for antennas 1 and 2, respectively, to transmit reference symbols. In the second slot, code group 3 uses orthogonal resources 1 and 2, for antennas 1 and 2, respectively, to transmit data symbols. Also in the second slot, code group 3 uses orthogonal resources 2 and 3, for antennas 1 and 2, respectively, to transmit reference symbols.

TABLE 12

Resource Coding, Design A

| CG Index | Slot 1 | | | | Slot 2 | | | |
|---|---|---|---|---|---|---|---|---|
| | Data Res. | | RS Res. | | Data Res. | | RS Res. | |
| | A1 | A2 | A1 | A2 | A1 | A2 | A1 | A2 |
| 1 | 0 | 1 | 0 | 1 | 0 | 1 | 0 | 1 |
| 2 | 1 | 2 | 2 | 3 | 2 | 3 | 0 | 1 |
| 3 | 2 | 3 | 0 | 1 | 1 | 2 | 2 | 3 |
| 4 | 3 | 0 | 2 | 3 | 3 | 0 | 2 | 3 |

TABLE 13

Resource Coding, Design B

| CG Index | Slot 1 | | | | Slot 2 | | | |
|---|---|---|---|---|---|---|---|---|
| | Data Res. | | RS Res. | | Data Res. | | RS Res. | |
| | A1 | A2 | A1 | A2 | A1 | A2 | A1 | A2 |
| 1 | 0 | 2 | 0 | 2 | 0 | 2 | 0 | 2 |
| 2 | 0 | 3 | 1 | 3 | 0 | 3 | 1 | 3 |
| 3 | 1 | 2 | 1 | 3 | 1 | 3 | 0 | 2 |
| 4 | 1 | 3 | 0 | 2 | 1 | 2 | 1 | 3 |

In an optimum design, the minimum distance between all pairs of codewords should be as large as possible. Table 13 shows an alternate embodiment of a systematic resource coding.

For a system using the coding of Table 13, the two antennas use disjoint resources, i.e. resources used for antenna 1 (A1) for any CG are different from resources used by antenna 2 (A2) for any other CG. By contrast, in Table 12, all resources are used by both antennas.

Modulation Coding

In a full diversity code, the modulation symbols only affect the pairwise error probability of the codewords in the same CG. Based on this observation, it is possible to do the modulation coding for a single CG and repeat it for all other CGs.

TABLE 14

An optimum modulation coding

| Codeword Index | Slot 1 | | Slot 2 | |
|---|---|---|---|---|
| | Ant. 1 | Ant. 2 | Ant. 1 | Ant. 2 |
| 1 | 1 | $-j$ | 1 | $-j$ |
| 2 | $j$ | $j$ | $j$ | 1 |
| 3 | $-1$ | $-1$ | $-1$ | $-1$ |
| 4 | $-j$ | 1 | $-j$ | $j$ |

Table 14 shows an example modulation coding which provides the full diversity order and is optimum in the sense that the minimum codeword's distance is maximized over all pairs of codewords. In this table, each cell of a row indicates a modulation symbol used by a codeword of each code group. The columns indicate the modulation symbols used on each antenna and each slot. For example, in the first slot, codeword index 4 uses modulation symbols $-j$ and 1, for antennas 1 and 2, respectively. In the second slot, codeword index 4 uses modulation symbols $-j$ and $j$, for antennas 1 and 2, respectively.

Given a resource coding and a modulation coding approach, an embodiment of a complete STRSD code is constructed using the resource coding of Table 12 and the modulation coding of Table 14. Since there are 4 codewords per CG, and 4 CGs, there are a total of 16 codewords in the embodied STRSD code. A codeword of this STRSD code with index 4(K−1)+L−1, where K is the CG index that varies from 1 to 4, and L is the codeword index that varies from 1 to 4 is generated as follows. First, the orthogonal resources of the $K^{th}$ CG for the data and reference symbols on all slots and antennas are looked up from Table 12. Second, the modulation symbols for all slots and antennas are looked up from Table 14. A second embodiment of a complete STRSD code is generated in the same way using Table 13 and Table 14.

By now, it will be appreciated that there is disclosed herein a transmission method and apparatus in which data and orthogonal resources can be different over antennas for the data symbols or the reference symbols, including cases where data and resources can vary over slots between antennas. In a disclosed diversity transmission methodology for transmitting information bits using resource selection on multiple antennas, a first allocation of at least two orthogonal resources is received, from which first and second orthogonal resources are selected according to the state of the information bits. Subsequently, a first symbol is transmitted in a first symbol instant on a first antenna using the first orthogonal resource, and a second symbol is transmitted in the first symbol instant on a second antenna using the second orthogonal resource, provided that the first and second orthogonal resources are different, and the first and second symbols are either reference symbols or modulation symbols.

In other embodiments, the disclosed transmission method and apparatus are used in cases where all values of the data symbol are associated with each of the orthogonal resources for the reference symbol. The resulting behavior provides good distance properties for the STRSD code. As disclosed, the diversity transmission method is used when the first and second symbols are modulation symbols. In this case, a third orthogonal resource is selected from the allocated orthogonal resources according to the state of the information bits. Subsequently, a first reference symbol is transmitted in a second symbol instant on the first antenna using one orthogonal resource of the allocated orthogonal resources, and a second reference symbol is transmitted in the second symbol instant on the second antenna using the third orthogonal resource. In addition, a value is selected for the second modulation symbol according to the information bits, where the value is one of a plurality of N values, and where each of the plurality of N values and the third orthogonal resource is selected for at least one combination of the information bits.

In other embodiments, the disclosed transmission method and apparatus are used in cases where there is variable rate operation. As disclosed, the diversity transmission method selects a first allocated orthogonal resource as the first orthogonal resource and the second allocated orthogonal resource as the second orthogonal resource when a first and a second information bit of the information bits are both a first state. In addition, a third allocated orthogonal resource is selected as the third orthogonal resource when a third information bit of the information bits is the first state and at least one of the first information bit and the second information bit is a second state.

In other embodiments, the disclosed transmission method and apparatus are used in cases where the data symbol in a second slot is different from the data symbol in the first slot. As disclosed, the diversity transmission method selects a third and a fourth modulation symbol according to the state of the information bits, where the fourth modulation symbol is different from the second symbol for at least one combination of the information bits. Subsequently, the third modulation symbol is transmitted in a second symbol instant on the first antenna using one orthogonal resource of the allocated orthogonal resources, and the fourth modulation symbol is transmitted in the second symbol instant on the second antenna using another orthogonal resource of the allocated orthogonal resources.

In other embodiments, the disclosed transmission method and apparatus are used in cases where the orthogonal resource in a second slot is different from the orthogonal resource in the first slot. As disclosed, the diversity transmission method selects a third orthogonal resource of the allocated orthogonal resources according to the state of the information bits, where the third orthogonal resource is different from the second orthogonal resource for at least one combination of the information bits. Subsequently, the first symbol is transmitted in a second symbol instant on the first antenna using one orthogonal resource of the allocated orthogonal resources, and the second symbol is transmitted in the second symbol instant on the second antenna using the third orthogonal resource of the allocated orthogonal resources.

In other embodiments, the disclosed transmission method and apparatus are used in cases where there are two resource allocations from different component carriers and where combined Nack/DTX indications are used so that the code functions if either allocation is missed. In a disclosed diversity transmission methodology for transmitting information bits using resource selection on multiple antennas, a first allocation of two or more orthogonal resources is received. In response, at least one of a first and a second information bit of the information bits is set to a first state if an allocation for at least one of the first and second orthogonal resources for use in the first symbol instant is not received, and at least one of a third and a fourth information bit of the information bits is set to the first state if an allocation for at least one of a third and a fourth orthogonal resource for use in the first symbol instant is not received, provided that the third and the fourth orthogonal resource are both different from either of the first and the second orthogonal resources. Subsequently, first and second allocated orthogonal resources are selected as the first and second orthogonal resources when the first and the second information bit are both the first state when the UE has received an allocation containing the first and the second allocated orthogonal resource for use in the first symbol instant. Alternatively, the third and a fourth allocated orthogonal resource are selected as the first and the second orthogonal resource when the third and the fourth information bits are both the first state and at least one of the first information bit and the second information bit is a second state and the UE has received an allocation containing the third and the fourth allocated orthogonal resource for use in the first symbol instant. Finally, the first and second symbols are transmitted only if at least one of the first and second orthogonal resources is selected, provided that the first symbol is transmitted in a first symbol instant on a first antenna using the first orthogonal resource; the second symbol is transmitted in the first symbol instant on a second antenna using the second orthogonal resource; the first and second orthogonal resources are different; and the first and second symbols are both one of a reference symbol and a modulation symbol.

What is claimed is:

1. A method for transmitting a plurality of information bits using resource selection on multiple antennas, the method comprising:
   selecting a first and a second orthogonal resource from an allocation of more than two orthogonal resources according to the state of the plurality of information bits;
   transmitting a first symbol in a first symbol instant on a first antenna using the first orthogonal resource; and
   transmitting a second symbol in the first symbol instant on a second antenna using the second orthogonal resource,
   wherein the first and second orthogonal resources are different from each other,
   wherein the first symbol is either a reference symbol or a modulation symbol, and
   wherein the second symbol is a modulation symbol,
   selecting a third orthogonal resource from the allocated orthogonal resources according to the state of the plurality of information bits, wherein the third orthogonal resource is different from the second orthogonal resource for at least one combination of the plurality of information bits; and
   transmitting a reference symbol on the second antenna using the third orthogonal resource of the allocated orthogonal resources.

2. The method of claim 1, wherein the first symbol is a modulation symbol, and wherein the method further comprises:
   transmitting a first reference symbol in a second symbol instant on the first antenna using one orthogonal resource of the allocated orthogonal resources;
   transmitting a second reference symbol in the second symbol instant on the second antenna using the third orthogonal resource; and
   selecting a value for the second modulation symbol according to the state of the plurality of information bits, wherein the value is one of a plurality of N values, and wherein each of the plurality of N values and the third orthogonal resource is selected for at least one state of the plurality of information bits.

3. The method of claim 1, further comprising:
   when a first and a second information bit of the plurality of information bits are both a first state, selecting the first and the second orthogonal resources from a first subset,
   wherein the first subset comprises orthogonal resources from the allocation of orthogonal resources, and
   wherein the first subset comprises fewer orthogonal resources than the allocation of orthogonal resources; and
   when a third information bit of the plurality of information bits is the first state and at least one of the first information bit and the second information bit is a second state, selecting the first and the second orthogonal resources from a second subset,
   wherein the second subset comprises orthogonal resources from the allocation of orthogonal resources, and
   wherein the second subset comprises a different number of orthogonal resources than the first subset of the allocation of orthogonal resources.

4. The method of claim 1, wherein the first symbol is a modulation symbol, and wherein the method further comprises:
   selecting a third and a fourth modulation symbol according to the state of the plurality of information bits, wherein the fourth modulation symbol is different from the second symbol for at least one state of the plurality of information bits;

transmitting the third modulation symbol in a second symbol instant on the first antenna using one orthogonal resource of the allocation of orthogonal resources; and transmitting the fourth modulation symbol in the second symbol instant on the second antenna using another orthogonal resource of the allocation of orthogonal resources.

5. The method of claim 1, further comprising:

selecting a fourth orthogonal resource of the allocation of orthogonal resources according to the state of the plurality of information bits, wherein the fourth orthogonal resource is different from the second orthogonal resource for at least one state of the plurality of information bits;

transmitting the first symbol in a second symbol instant on the first antenna using one orthogonal resource of the allocation of orthogonal resources; and transmitting the second symbol in the second symbol instant on the second antenna using the fourth orthogonal resource of the allocation of orthogonal resources.

6. A method for receiving a plurality of information bits transmitted using resource selection from a transmitter in a wireless communication network, wherein the transmitter is configured to transmit upon multiple antennas, the method comprising:

allocating a plurality of orthogonal resources to a multi-antenna device, from which the device selects a first and a second orthogonal resource according to the state of the plurality of information bits;

receiving a first symbol using the first orthogonal resource, wherein the first symbol was transmitted in a first symbol instant; and receiving a second symbol using the second orthogonal resource, wherein the second symbol was transmitted in the first symbol instant, wherein the first and second orthogonal resources are different, wherein the first symbol is either a reference symbol or a modulation symbol, and wherein the second symbol is a modulation symbol, receiving a reference symbol using a third orthogonal resource of the plurality of orthogonal resources, wherein the third orthogonal resource is different from the second orthogonal resource for at least one state of the plurality of information bits.

7. The method of claim 6, wherein the first symbol is a modulation symbol, and wherein the method further comprises:

receiving a third modulation symbol using one orthogonal resource of the plurality of orthogonal resources, wherein the third modulation symbol was transmitted in a second symbol instant; and receiving a fourth modulation symbol using another orthogonal resource of the plurality of orthogonal resources, wherein the fourth modulation symbol was transmitted in the second symbol instant; and wherein the fourth modulation symbol is different from the second symbol for at least one combination of the plurality of information bits.

8. The method of claim 6, further comprising:

receiving a third symbol using one orthogonal resource of the plurality of orthogonal resources; wherein the third symbol was transmitted in a second symbol instant; and receiving a fourth symbol in the second symbol instant using a fourth orthogonal resource of the plurality of orthogonal resources, wherein the fourth symbol was transmitted in the second symbol instant, and wherein the fourth orthogonal resource is different from the second orthogonal resource for at least one state of the plurality of information bits.

9. A client node for transmitting a plurality of information bits using resource selection on multiple antennas, the node comprising: processing logic configured to:

select a first and a second orthogonal resource from an allocation of more than two orthogonal resources according to the state of the plurality of information bits;

transmit a first symbol in a first symbol instant on a first antenna using the first orthogonal resource; and transmit a second symbol in the first symbol instant on a second antenna using the second orthogonal resource, wherein the first and second orthogonal resources are different, and wherein the first symbol is either a reference symbol or a modulation symbol and the second symbol is a modulation symbol;

select a third orthogonal resource from the allocated orthogonal resources according to the state of the plurality of information bits, wherein the third orthogonal resource is different from the second orthogonal resource for at least one combination of the plurality of information bits; and transmit a reference symbol on the second antenna using the third orthogonal resource of the allocated orthogonal resources.

10. The client node of claim 9, wherein the first symbol is a modulation symbol, and wherein the processing logic is further configured to:

select a third and a fourth modulation symbol according to the state of the plurality of information bits, wherein the fourth modulation symbol is different from the second symbol for at least one state of the plurality of information bits;

transmit the third modulation symbol in a second symbol instant on the first antenna using one orthogonal resource of the allocation of orthogonal resources; and transmit the fourth modulation symbol in the second symbol instant on the second antenna using another orthogonal resource of the allocation of orthogonal resources.

11. The client node of claim 9, wherein the processing logic is further configured to:

select a fourth orthogonal resource of the allocation of orthogonal resources according to the state of the plurality of information bits, wherein the fourth orthogonal resource is different from the second orthogonal resource for at least one state of the plurality of information bits;

transmit the first symbol in a second symbol instant on the first antenna using one orthogonal resource of the allocation of orthogonal resources; and transmit the second symbol in the second symbol instant on the second antenna using the fourth orthogonal resource of the allocation of orthogonal resources.

* * * * *

UNITED STATES PATENT AND TRADEMARK OFFICE
CERTIFICATE OF CORRECTION

PATENT NO. : 8,665,993 B2
APPLICATION NO. : 13/248602
DATED : March 4, 2014
INVENTOR(S) : Masoud Ebrahimi Tazeh Mahalleh et al.

Page 1 of 1

It is certified that error appears in the above-identified patent and that said Letters Patent is hereby corrected as shown below:

On the Title Page

On Page 2, In Column 1 (Other Publications), In Line 16-17, delete "Channels and Modulation" and insert -- Layer Procedures --, therefor.

Signed and Sealed this
Twenty-fourth Day of June, 2014

Michelle K. Lee
*Deputy Director of the United States Patent and Trademark Office*